(12) United States Patent
Watanabe et al.

(10) Patent No.: US 6,554,101 B2
(45) Date of Patent: Apr. 29, 2003

(54) STRUCTURE AND METHOD OF ABSORBING AND SHIELDING SOUND

(75) Inventors: Kyoichi Watanabe, Kanagawa-ken (JP); Hiroaki Miura, Kanagawa-ken (JP); Takayuki Fukui, Kanagawa-ken (JP); Jun Okada, Tokyo (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/944,358

(22) Filed: Sep. 4, 2001

(65) Prior Publication Data

US 2002/0027997 A1 Mar. 7, 2002

(30) Foreign Application Priority Data

Sep. 4, 2000 (JP) .......................... 2000-266661

(51) Int. Cl.[7] ................................. B64C 1/00
(52) U.S. Cl. ...................................... 181/290
(58) Field of Search ................................. 181/290, 291, 181/292, 293, 294

(56) References Cited

U.S. PATENT DOCUMENTS

| | | | | |
|---|---|---|---|---|
| 3,652,360 A | * | 3/1972 | Hartman et al. | 156/244.11 |
| 5,814,170 A | * | 9/1998 | Shibusawa et al. | 156/259 |
| 5,886,306 A | * | 3/1999 | Patel et al. | 181/290 |
| 5,895,013 A | * | 4/1999 | Towfiq | 181/208 |
| 5,975,237 A | * | 11/1999 | Welch et al. | 181/213 |
| 6,123,171 A | * | 9/2000 | McNett et al. | 181/207 |

\* cited by examiner

*Primary Examiner*—Kim R. Lockett
(74) *Attorney, Agent, or Firm*—McDermott, Will & Emery

(57) ABSTRACT

A structure and method for absorbing and shielding sound from a source of sound are disclosed having at least four layers including a first panel layer 2, a sound absorbing material layer 3, a first air layer 4 and a second panel layer 6, which are located in a sequence from a source of sound. The sound absorbing material layer 3 has a ventilating property.

32 Claims, 22 Drawing Sheets

FIG.23A

Specification Of Sound Absorbing And Shielding Structure

| Items | Sound Absorbing Layer | | | | | | | First Air Layer | | |
|---|---|---|---|---|---|---|---|---|---|---|
| | Number of Layers | Layer Constitution | | Bending Elasticity Coeff. [kpa] | Opening Rate [%] | Surface Density [kg/m2] | Maximum Thickness [%] | Content Rate [%] | Presence of Fiber Layer YES/NO |
| | | Material | High Density Layer | | | | | | | |
| Example 1 | 1 | Fiber | - | 1000 | - | 1 | 60 | 80 | NO |
| Example 2 | 1 | Fiber | - | 1000 | - | 1 | 10 | 80 | NO |
| Example 3 | 1 | Fiber | - | 1000 | - | 1 | 95 | 80 | NO |
| Example 4 | 1 | Fiber | - | 1000 | - | 1 | 60 | 10 | NO |
| Example 5 | 1 | Fiber | - | 1000 | - | 1 | 60 | 90 | NO |
| Example 6 | 1 | Fiber | - | 1000 | - | 1 | 60 | 80 | NO |
| Example 7 | 1 | Fiber | - | 1000 | - | 1 | 60 | 80 | NO |
| Example 8 | 1 | Fiber | - | 1000 | - | 1 | 60 | 80 | NO |
| Example 9 | 1 | Fiber | - | 1000 | - | 1 | 60 | 80 | NO |
| Example 10 | 1 | Fiber | - | 1000 | - | 1 | 60 | 80 | NO |
| Example 11 | 1 | Fiber | - | 1000 | - | - | 0.5 | 60 | 80 | NO |
| Example 12 | 1 | Fiber | - | 100 | - | - | - | 60 | 80 | NO |
| Example 13 | 1 | Fiber | - | 2000 | - | 2 | 60 | 80 | NO |
| Example 14 | 1 | Shoddy | - | 1000 | - | 1 | 60 | 80 | NO |
| Example 15 | 1 | Urethane | - | 3000MPa | - | - | 60 | 80 | NO |
| Example 16 | 2 | Fiber | Fiber | 1000 | - | 3 | 60 | 80 | NO |
| Example 17 | 2 | Fiber | Plastic | 1000 | 1 | 5 | 60 | 80 | NO |
| Example 18 | 2 | Fiber | Plastic | - | 80 | 5 | 60 | 80 | NO |
| Example 19 | 2 | Fiber | Plastic | - | 40 | 5 | 60 | 80 | NO |
| Example 20 | 1 | Fiber | - | 1000 | - | 1 | 60 | 80 | YES |
| Example 21 | 1 | Fiber | - | 1000 | - | 1 | 60 | 80 | NO |
| Example 22 | 1 | Fiber | - | 1000 | - | 1 | 60 | 80 | YES |
| Example 23 | 1 | Fiber | - | 50 | - | 0.5 | 60 | 80 | NO |
| Example 24 | 1 | Fiber | - | 3000 | - | 3 | 60 | 80 | NO |
| Example 25 | 2 | Fiber | Plastic | - | 90 | 5 | 60 | 80 | NO |
| Compar. 1 | 2 | Fiber | Plastic | - | 0 | 5 | 60 | 80 | NO |
| Compar. 2 | 2 | Shoddy | Plastic | - | 0 | 5 | 60 | 80 | NO |
| Compar. 3 | 2 | Urethane | Plastic | - | 0 | 5 | 60 | 80 | NO |

| Items | Specification Of Sound Absorbing And Shielding Structure - Second Panel Layer | | | | Appraised Result | | | | |
|---|---|---|---|---|---|---|---|---|---|
| | Surface Density [kg/m²] | Opening Rate [%] | Surface Ratio | Presence of Fiber Layer YES/NO | Sound Absorbing Layer | | Sound Absorb. Structure | | |
| | | | | | Shape Retaining Property | Piercing Property | Fabrication Steps | Sound Shielding Perform. | |
| Example 1 | 4 | 20 | 1:1 | NO | ○ | ○ | ◎ | ◎ | |
| Example 2 | 4 | 20 | 1:1 | NO | ○ | ○ | ◎ | ◎ | |
| Example 3 | 4 | 20 | 1:1 | NO | ○ | ○ | ○ | ○ | |
| Example 4 | 4 | 20 | 1:1 | NO | ○ | ○ | ◎ | ○ | |
| Example 5 | 4 | 20 | 1:1 | NO | ○ | ○ | ◎ | ○ | |
| Example 6 | 0.5 | 20 | 1:1 | NO | ○ | ○ | ◎ | ○ | |
| Example 7 | 10 | 20 | 1:1 | NO | ○ | ○ | ◎ | ○ | |
| Example 8 | 4 | 0.01 | 1:1 | NO | ○ | ○ | ◎ | ○ | |
| Example 9 | 4 | 50 | 1:1 | NO | ○ | ○ | ◎ | ○ | |
| Example 10 | 4 | 20 | 1:5 | NO | ○ | ○ | ◎ | ○ | |
| Example 11 | 4 | 20 | 5:1 | NO | △ | △ | ◎ | ◎ | |
| Example 12 | 4 | 20 | 1:1 | NO | ○ | ○ | ◎ | ◎ | |
| Example 13 | 4 | 20 | 1:1 | NO | △ | △ | ◎ | ◎ | |
| Example 14 | 4 | 20 | 1:1 | NO | △ | ○ | △ | ◎ | |
| Example 15 | 4 | 20 | 1:1 | NO | ○ | ○ | △ | ◎ | |
| Example 16 | 4 | 20 | 1:1 | NO | ○ | ○ | △ | ◎ | |
| Example 17 | 4 | 20 | 1:1 | NO | ○ | ○ | △ | ◎ | |
| Example 18 | 4 | 20 | 1:1 | NO | ○ | ○ | △ | ◎ | |
| Example 19 | 4 | 20 | 1:1 | NO | ○ | ○ | △ | ◎ | |
| Example 20 | 4 | 20 | 1:1 | NO | ○ | ○ | ○ | ◎ | |
| Example 21 | 4 | 20 | 1:1 | YES | ○ | ○ | ○ | ○ | |
| Example 22 | 4 | 20 | 1:1 | YES | ○ | ○ | — | ○ | |
| Example 23 | 4 | 20 | 1:1 | NO | × | × | — | ○ | |
| Example 24 | 4 | 20 | 1:1 | NO | ○ | △ | △ | ○ | |
| Example 25 | 4 | 20 | 1:1 | NO | × | △ | △ | ○ | |
| Compar. 1 | 4 | 20 | 1:1 | NO | △ | △ | △ | △ | |
| Compar. 2 | 4 | 20 | 1:1 | NO | △ | △ | △ | × | |
| Compar. 3 | 4 | 20 | 1:1 | NO | △ | △ | △ | × | |

FIG.24A

| Items | Second Air Layer | | Specification Of Sound Absorbing And Shielding Structure | | | | | | | |
|---|---|---|---|---|---|---|---|---|---|---|
| | Maximum Thickness [%] | Content Rate [%] | Number of Layers | Layer Structure | | Bending Elasticity Coeff. [kpa] | Opening Rate [%] | Venial YES/NO | Surface Density [kg/m2] |
| | | | | Material | High Dens. Layer | | | | |
| Example 26 | 30 | 80 | 1 | Fiber | - | 1000 | - | YES | 1 |
| Example 27 | 10 | 80 | 1 | Fiber | - | 1000 | - | YES | 1 |
| Example 28 | 60 | 80 | 1 | Fiber | - | 1000 | - | YES | 1 |
| Example 29 | 30 | 10 | 1 | Fiber | - | 1000 | - | YES | 1 |
| Example 30 | 30 | 90 | 1 | Fiber | - | 1000 | - | YES | 1 |
| Example 31 | 30 | 80 | 1 | Fiber | - | 1000 | - | YES | 1 |
| Example 32 | 30 | 80 | 1 | Fiber | - | 1000 | - | YES | 1 |
| Example 33 | 30 | 80 | 1 | Fiber | - | 1000 | - | YES | 1 |
| Example 34 | 30 | 80 | 1 | Fiber | - | 1000 | - | YES | 1 |
| Example 35 | 30 | 80 | 1 | Fiber | - | 1000 | - | YES | 1 |
| Example 36 | 30 | 80 | 1 | Fiber | - | 1000 | - | YES | 1 |
| Example 37 | 30 | 80 | 1 | Fiber | - | 1000 | - | YES | 1 |
| Example 38 | 30 | 80 | 1 | Fiber | - | 1000 | - | YES | 1 |
| Example 39 | 30 | 80 | 1 | Fiber | - | 100 | - | YES | 0.5 |
| Example 40 | 30 | 80 | 1 | Fiber | - | 2000 | - | YES | 2 |
| Example 41 | 30 | 80 | 1 | Shoddy | - | 1000 | - | YES | 1 |
| Example 42 | 30 | 80 | 1 | Urethane | - | 1000 | - | YES | 1 |
| Example 43 | 30 | 80 | 2 | Fiber | Fiber | 300MPa | 1 | YES | 3 |
| Example 44 | 30 | 80 | 2 | Fiber | Fiber | - | 1 | YES | 5 |
| Example 45 | 30 | 80 | 2 | Fiber | Fiber | - | 80 | YES | 5 |
| Example 46 | 30 | 80 | 2 | Fiber | Fiber | - | 40 | YES | 5 |
| Example 47 | 30 | 80 | 1 | Fiber | - | 1000 | - | YES | 1 |
| Example 48 | 30 | 80 | 1 | Fiber | - | 1000 | - | YES | 1 |
| Example 49 | 30 | 80 | 1 | Fiber | - | 1000 | - | YES | 1 |
| Example 50 | 30 | 80 | 1 | Fiber | - | 50 | - | YES | 0.5 |
| Example 51 | 30 | 80 | 1 | Fiber | - | 3000 | - | YES | 3 |
| Example 52 | 30 | 80 | 2 | Fiber | Fiber | - | 90 | YES | 5 |
| Compar. 4 | 3 | 80 | 2 | Fiber | Fiber | - | 0 | NO | 5 |
| Compar. 5 | 30 | 80 | 2 | Shoddy | Fiber | - | 0 | NO | 5 |
| Compar. 6 | 30 | 80 | 2 | Urethane | Fiber | - | 0 | NO | 5 |

| Items | Specification Of Sound Absorbing And Shielding Structure ||||||
|---|---|---|---|---|---|---|
| | First Air Layer ||| Second Panel Layer |||
| | Maximum Thickness [%] | Content Rate [%] | Fibrous Layer YES/NO | Surface Density [kg/m²] | Opening Rate [%] | Surface Ratio | Fibrous Layer YES/NO |
| Example 26 | 60 | 80 | NO | 4 | 20 | 1:1 | NO |
| Example 27 | 80 | 80 | NO | 4 | 20 | 1:1 | NO |
| Example 28 | 30 | 80 | NO | 4 | 20 | 1:1 | NO |
| Example 29 | 60 | 80 | NO | 4 | 20 | 1:1 | NO |
| Example 30 | 60 | 10 | NO | 4 | 20 | 1:1 | NO |
| Example 31 | 60 | 90 | NO | 4 | 20 | 1:1 | NO |
| Example 32 | 60 | 80 | NO | 0.5 | 20 | 1:1 | NO |
| Example 33 | 60 | 80 | NO | 10 | 20 | 1:1 | NO |
| Example 34 | 60 | 80 | NO | 4 | 0.01 | 1:1 | NO |
| Example 35 | 60 | 80 | NO | 4 | 50 | 1:1 | NO |
| Example 36 | 60 | 80 | NO | 4 | 20 | 1:5 | NO |
| Example 37 | 60 | 80 | NO | 4 | 20 | 5:1 | NO |
| Example 38 | 60 | 80 | NO | 4 | 20 | 1:1 | NO |
| Example 39 | 60 | 80 | NO | 4 | 20 | 1:1 | NO |
| Example 40 | 60 | 80 | NO | 4 | 20 | 1:1 | NO |
| Example 41 | 60 | 80 | NO | 4 | 20 | 1:1 | NO |
| Example 42 | 60 | 80 | NO | 4 | 20 | 1:1 | NO |
| Example 43 | 60 | 80 | NO | 4 | 20 | 1:1 | NO |
| Example 44 | 60 | 80 | NO | 4 | 20 | 1:1 | NO |
| Example 45 | 60 | 80 | NO | 4 | 20 | 1:1 | NO |
| Example 46 | 60 | 80 | NO | 4 | 20 | 1:1 | NO |
| Example 47 | 60 | 80 | YES | 4 | 20 | 1:1 | NO |
| Example 48 | 60 | 80 | NO | 4 | 20 | 1:1 | NO |
| Example 49 | 60 | 80 | YES | 4 | 20 | 1:1 | NO |
| Example 50 | 60 | 80 | NO | 4 | 20 | 1:1 | YES |
| Example 51 | 60 | 80 | NO | 4 | 20 | 1:1 | YES |
| Example 52 | 60 | 80 | NO | 4 | 20 | 1:1 | NO |
| Compar. 4 | 60 | 80 | NO | 4 | 20 | 1:1 | NO |
| Compar. 5 | 60 | 80 | NO | 4 | 20 | 1:1 | NO |
| Compar. 6 | 60 | 80 | NO | 4 | 20 | 1:1 | NO |

FIG.25

| Item | Appraised Result | | | |
|---|---|---|---|---|
| | Sound Absorbing Material Layer | | Sound Absorbing And Shielding Structure | |
| | Shape Retaining Property | Piercing Property | Fabrication Steps | Sound Shield. Property |
| Example 26 | ○ | ○ | ○ | ◎ |
| Example 27 | ○ | ○ | ○ | ○ |
| Example 28 | ○ | ○ | ○ | ◎ |
| Example 29 | ○ | ○ | ○ | ○ |
| Example 30 | ○ | ○ | ○ | ◎ |
| Example 31 | ○ | ○ | ○ | ◎ |
| Example 32 | ○ | ○ | ○ | ◎ |
| Example 33 | ○ | ○ | ○ | ○ |
| Example 34 | ○ | ○ | △ | ◎ |
| Example 35 | ○ | ○ | ○ | ◎ |
| Example 36 | ○ | ○ | ○ | ○ |
| Example 37 | ○ | ○ | ○ | ○ |
| Example 38 | ○ | ○ | ○ | ○ |
| Example 39 | △ | △ | ○ | ○ |
| Example 40 | ○ | △ | ○ | ◎ |
| Example 41 | △ | △ | △ | ○ |
| Example 42 | △ | △ | △ | ○ |
| Example 43 | ○ | △ | △ | ◎ |
| Example 44 | ○ | ○ | △ | ○ |
| Example 45 | ○ | ○ | △ | ○ |
| Example 46 | ○ | △ | △ | ◎ |
| Example 47 | ○ | ○ | △ | ◎ |
| Example 48 | ○ | ○ | △ | ◎ |
| Example 49 | ○ | ○ | △ | ◎ |
| Example 50 | × | ○ | × | ◎ |
| Example 51 | ○ | × | × | ◎ |
| Example 52 | △ | △ | △ | ◎ |
| Compar. 4 | △ | △ | △ | △ |
| Compar. 5 | △ | △ | △ | × |
| Compar. 6 | △ | △ | △ | × |

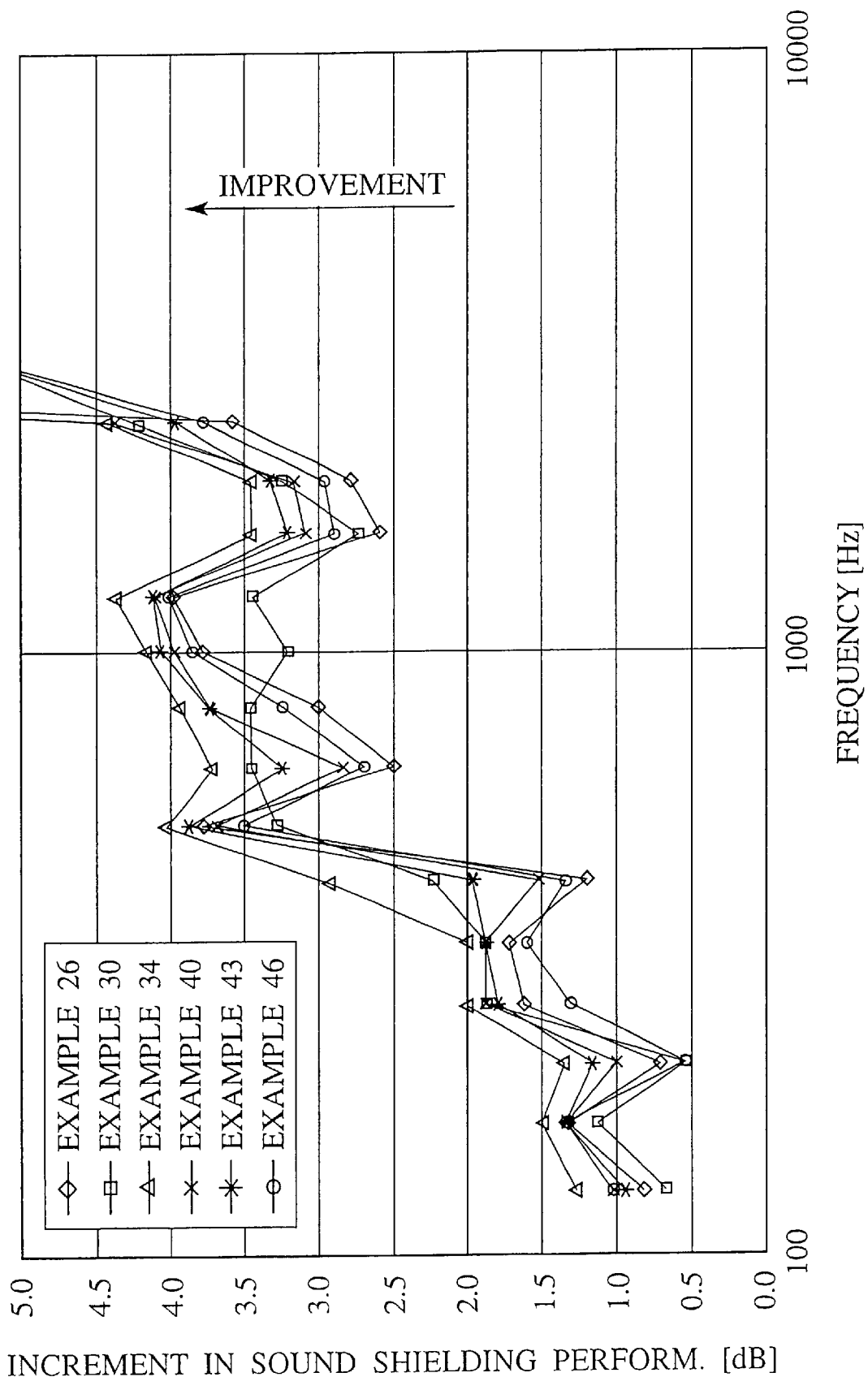

FIG.30A

| Items | Intermediate Layer | | | | | Third Panel Layer | |
|---|---|---|---|---|---|---|---|
| | Surface Area Rate (%) | Air Layer | | | | Opening Rate (%) | Surf. Dens. (kg/m²) |
| | | Thickness (%) | Content (Piece) | Volume Ratio (%) | | | |
| Example 53 | 5 | 50 | 1 | 25 | | - | - |
| Example 54 | 90 | 50 | 1 | 25 | | - | - |
| Example 55 | 5 | 3 | 1 | 70 | | - | - |
| Example 56 | 5 | 70 | 1 | 25 | | - | - |
| Example 57 | 5 | 50 | 1 | 30 | | - | - |
| Example 58 | 5 | 50 | 4 | 25 | | - | - |
| Example 59 | 5 | 50 | 1 | 10 | | - | 1 |
| Example 60 | 5 | 50 | 1 | 25 | | 1 | 1 |
| Example 61 | 5 | 50 | 1 | 90 | | 50 | 0.5 |
| Example 62 | 5 | 50 | 1 | 25 | | 20 | 10 |
| Example 63 | 5 | 50 | 1 | 25 | | 20 | - |
| Example 64 | 5 | 50 | 1 | 25 | | - | - |
| Example 65 | 5 | 50 | 1 | 25 | | - | - |
| Example 66 | 5 | 50 | 1 | 25 | | - | - |
| Example 67 | 5 | 50 | 1 | 25 | | - | - |
| Example 68 | 5 | 50 | 1 | 25 | | - | - |
| Example 69 | 5 | 50 | 1 | 25 | | - | - |
| Example 70 | 5 | 50 | 1 | 25 | | - | - |
| Example 71 | 5 | 50 | 1 | 25 | | - | - |
| Example 72 | 5 | 50 | 1 | 25 | | - | - |
| Example 73 | 5 | 50 | 1 | 25 | | - | - |

FIG.30B /106

| Items | First Panel Layer | | | | | | | | Distance Between Panels | | Preset Freq. (Hz) | Increment on Performance | |
|---|---|---|---|---|---|---|---|---|---|---|---|---|---|
| | Material | Bend. Elasticity Coeff. (kpa) | Opening Rate (%) | Vent. Rate (%) | Surface Density (kg/m2) | Amount of Vent. (cm3/cm2 sec) | Thickness (mm) | Rate | (mm) | Rate Per 1/4 Wave Leng. (%) | | Preset Freq. (%) | Average (%) |
| Example 53 | Fiber | 1000 | 10 | 50 | 1 | 5 | 5 | 1/136 | 150 | 88 | 500 | 150 | 140 |
| Example 54 | Fiber | 1000 | 10 | 50 | 1 | 5 | 5 | 1/136 | 150 | 88 | 500 | 180 | 200 |
| Example 55 | Fiber | 1000 | 10 | 50 | 1 | 5 | 5 | 1/80 | 100 | 100 | 850 | 120 | 110 |
| Example 56 | Fiber | 1000 | 10 | 50 | 1 | 5 | 5 | 1/80 | 100 | 100 | 500 | 130 | 120 |
| Example 57 | Fiber | 1000 | 10 | 50 | 1 | 5 | 5 | 1/2200 | 250 | 113 | 850 | 120 | 115 |
| Example 58 | Fiber | 1000 | 10 | 50 | 1 | 5 | 5 | 1/2200 | 250 | 113 | 500 | 120 | 110 |
| Example 59 | Fiber | 1000 | 10 | 50 | 1 | 5 | 5 | 1/136 | 150 | 88 | 300 | 200 | 180 |
| Example 60 | Fiber | 1000 | 10 | 50 | 1 | 5 | 5 | 1/136 | 150 | 88 | 300 | 180 | 190 |
| Example 61 | Fiber | 1000 | 10 | 50 | 1 | 5 | 5 | 1/136 | 150 | 88 | 500 | 190 | 180 |
| Example 62 | Fiber | 1000 | 10 | 50 | 1 | 5 | 5 | 1/136 | 150 | 88 | 500 | 210 | 210 |
| Example 63 | Fiber | 500 | 10 | 50 | 0.8 | 8 | 8 | 1/85 | 150 | 88 | 500 | 140 | 130 |
| Example 64 | Fiber | 1500 | 10 | 50 | 9 | 2 | 10 | 1/68 | 150 | 88 | 500 | 160 | 150 |
| Example 65 | Fiber | 1000 | 1 | 50 | 1 | 5 | 5 | 1/136 | 150 | 88 | 500 | 140 | 130 |
| Example 66 | Fiber | 1000 | 50 | 50 | 1 | 5 | 5 | 1/136 | 150 | 88 | 500 | 150 | 160 |
| Example 67 | Fiber | 1000 | 10 | 30 | 1 | 5 | 5 | 1/136 | 150 | 88 | 500 | 180 | 130 |
| Example 68 | Fiber | 1000 | 10 | 100 | 1 | 5 | 5 | 1/136 | 150 | 88 | 500 | 140 | 160 |
| Example 69 | Fiber | 1000 | 10 | 50 | 0.5 | 9 | 5 | 1/136 | 150 | 88 | 500 | 120 | 110 |
| Example 70 | Fiber | 1400 | 10 | 50 | 10 | 1.5 | 10 | 1/68 | 150 | 88 | 500 | 200 | 180 |
| Example 71 | Fiber | 1000 | 10 | 50 | 9 | 1 | 3 | 1/227 | 150 | 88 | 500 | 180 | 170 |
| Example 72 | Fiber | 1000 | 10 | 50 | 0.5 | 10 | 10 | 1/68 | 150 | 88 | 500 | 110 | 110 |
| Example 73 | Plastic | 1000 | 10 | 50 | 0.5 | 5 | 3 | 1/227 | 150 | 88 | 500 | 120 | 110 |

STRUCTURE AND METHOD OF ABSORBING AND SHIELDING SOUND

BACKGROUND OF THE INVENTION

This invention relates to sound absorbing and shielding structures for automotive vehicles to attenuate noises in passenger compartments of the automotive vehicles and, more particularly, to a structure and method of absorbing and shielding sound at a remarkably improved sound shielding performance.

In general, sound absorbing and shielding materials have been employed in various areas of a house, a railway vehicle, an air craft and an automotive vehicle but are restricted by various conditions in dependence on the mounting areas. Especially in the automotive vehicle's application, restrictions involve a large amount of restrictive conditions in weight and space etc. It is thus required to provide the sound absorbing and shielding material which is light in weight and less in space.

For example, extensive research and development work has been undertaken in a dash insulator, which is composed of a sound absorbing section and a cover section, of the automotive vehicle to improve a performance of the sound absorbing and shielding structure by merely increasing the weight of the sound absorbing section and the cover section. Also, in the application of particular sound absorbing and shielding material, natural fibers such as a felt in the form of a layer is located in an area where sound shielding effect is needed, with the amount of such usage being increased with a view to improving the performance.

SUMMARY OF THE INVENTION

However, such a technique for merely increasing the weight of the sound absorbing material encounters a less improvement in the sound absorbing and shielding performance despite an increase in production cost with a resultant degraded performance especially in a low frequency area below 500 Hz. In addition, when it is required to further improve the performance with the use of presently employed components, the sound absorbing material is inevitably caused to increase in weight and volume, resulting in a deteriorated fuel consumption against a worldwide trend in the protection of environment. Thus, there is an increasing demand for improving performance of the sound absorbing and shielding structure.

The present invention has been made with a view to meeting the increasing demand in the related art and it is therefore an object of the present invention to provide a sound absorbing and shielding structure which is light in weight and is superior in a sound absorbing and shielding performance and which is specifically suited for use as a sound absorbing and shielding material of an automotive vehicle.

It is another object of the present invention to provide a method of absorbing and shielding sound from a source of sound at a highly improved sound absorbing and shielding performance.

According to a first aspect of the present invention, there is provided a sound absorbing and shielding structure which comprises at least four layers including a first panel layer, a sound absorbing material layer, and a second panel layer, which are located in a sequence from a source of sound, and wherein the first panel layer has a ventilating property.

With such a structure, the sound is first transmitted through the sound absorbing material layer and is incident on the second panel layer by which the sound is reflected back to the sound absorbing material layer again to be effectively absorbed thereby, resulting in a remarkably improved sound absorbing and shielding performance which is far superior to the related art practice.

According to a second aspect of the present invention, there is provided a sound absorbing and shielding structure which comprises first panel layer means located adjacent a source of sound, sound absorbing layer means fixedly supported by the first panel layer means, and second panel layer means spaced from the first panel layer means to define an air layer between the first and second panel layer means, wherein the sound absorbing layer means has a ventilating property.

According to a third aspect of the present invention, there is provided a method of absorbing and shielding sound from a source of sound, which comprises locating a first panel layer at a position adjacent a source of sound, fixing a sound absorbing material layer, which has a ventilating property, onto the first panel layer,
locating a second panel layer in a spaced relationship relative to the first panel, and defining an air layer between the first and second panel layers.

BRIEF DESCRIPTION OF THE DRAWINGS

The invention, together with objects and advantages thereof, may best be understood by reference to the following description of the presently preferred embodiments together with the accompanying drawings in which:

FIG. 23 is a table for illustrating specifications and appraised results of respective sound absorbing and shielding structures of the four-layered configuration in EXAMPLES 1 to 25 and COMPARISONS 1 to 3;

FIG. 24 is a table for illustrating specifications of respective sound absorbing and shielding structures of the six-layered configuration in EXAMPLES 26 to 52 and COMPARISONS 4 to 6;

FIG. 25 is a table for illustrating appraised results of respective sound absorbing and shielding structures of the six-layered configuration in EXAMPLES 26 to 52 and COMPARISONS 4 to 6;

FIG. 29 is a graph showing the sound shielding performances (sound transmission losses), as a difference over that of the COMPARISON 4, of typical examples of the sound absorbing and shielding structures of the six-layered configuration according to the present invention, plotted in terms of a whole frequency range; and FIG. 30 is a table for illustrating the specifications and appraised results of respective sound absorbing and shielding structures obtained in EXAMPLES 53 to 73.

DETAILED DESCRIPTION OF THE PREFERRED EMBODIMENTS

A sound absorbing and shielding structure embodying the present invention is constructed having at least four layers composed of a first panel layer, a sound absorbing material layer, an air layer and a second panel layer which are located in a sequence from a source of sound, with these components being particularly designed in a manner as will be described below to provide an excellent sound absorbing and shielding performance.

Figure 5:
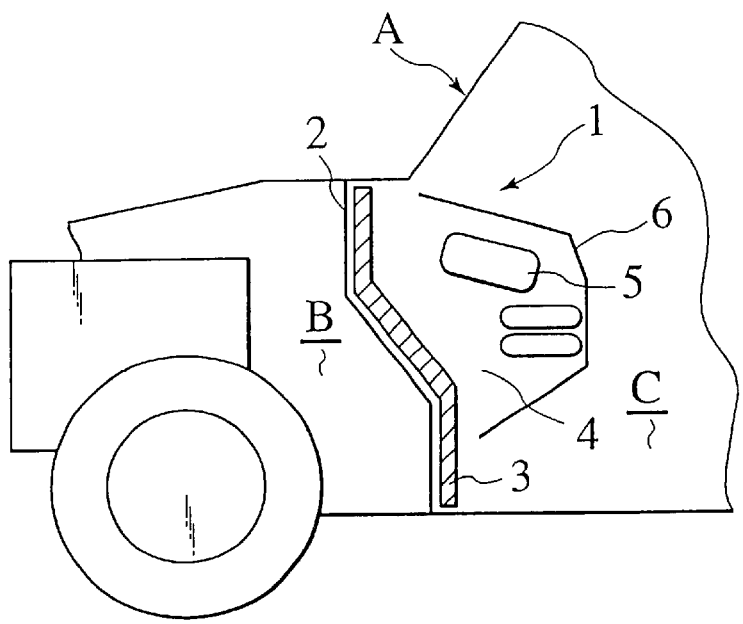
FIG. 5 is a partial cutaway view of an automotive vehicle employing a first preferred embodiment of a sound absorbing and shielding structure of the four-layered configuration according to the present invention.

FIG. 5 shows in schematic cross section a preferred embodiment of a sound absorbing and shielding structure according to the present invention as applied to an automotive vehicle. The sound absorbing and shielding structure of the present invention is specifically suited for use in an object having a source of sound, such as an automotive vehicle, a railway vehicle, an aircraft and a house, etc., but will be exemplarily described as applied to a vehicle body A of the automotive vehicle.

In FIG. 5, the vehicular body A includes a partition wall, i.e., a dash insulator composed of a first panel layer 2 of the sound absorbing and shielding structure 1, with the first panel layer 2 bisecting the vehicle body A from an engine room B to a passenger compartment C The vehicle body A also includes a sound absorbing material layer 3 located in close proximity to the first panel layer 2 in the passenger compartment C, an air layer (a first air layer) 4 defined adjacent the sound absorbing material layer 3, and an instrument panel composed of a second panel layer 6 projecting in the passenger compartment C to confine the air layer 4. The vehicular body A further includes content products 5 mounted in the air layer 4 between the sound absorbing material 25 layer 3 and the second panel layer 6.

Figure 6:
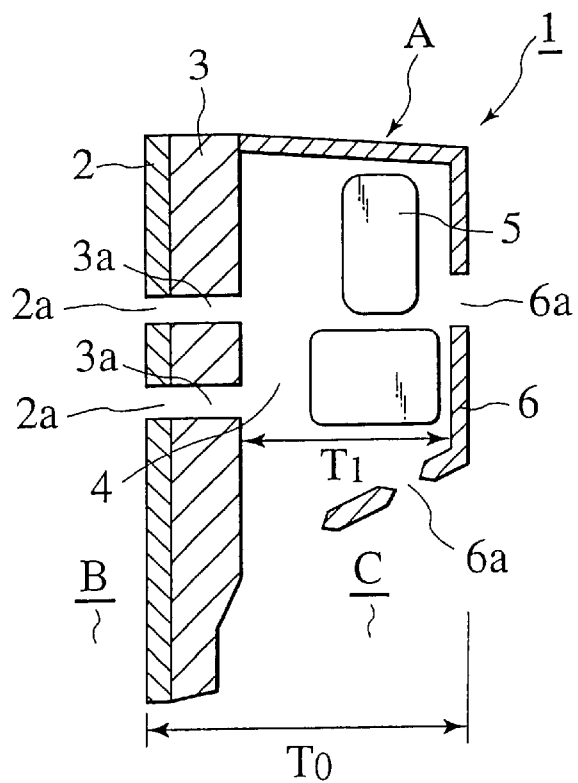
FIG. 6 is an enlarged cross sectional view of the sound absorbing and shielding structure of the four-layered configuration, having a single-layered sound absorbing material layer, shown in FIG. 5.

FIG. 6 is an enlarged, cross sectional side view of the sound absorbing and shielding structure 1 illustrating a typical example thereof wherein the sound absorbing material layer 3 is made of a single layer. In the illustrated embodiment of FIG. 6, the first panel layer 2 and the sound absorbing material layer 3 have plural through-bores 2a and 3a, respectively, to allow other component parts to be mounted therein. Likewise, the second panel layer 6 has through-bores 6a which do not necessarily mount the same component parts as those passing through the through-bores 2a and 3a of the first panel layer 2 and the sound absorbing material layer 3, respectively, and which enable content products such as inner component parts 5 of respective instruments (not shown) to be mounted therein.

Figure 1:
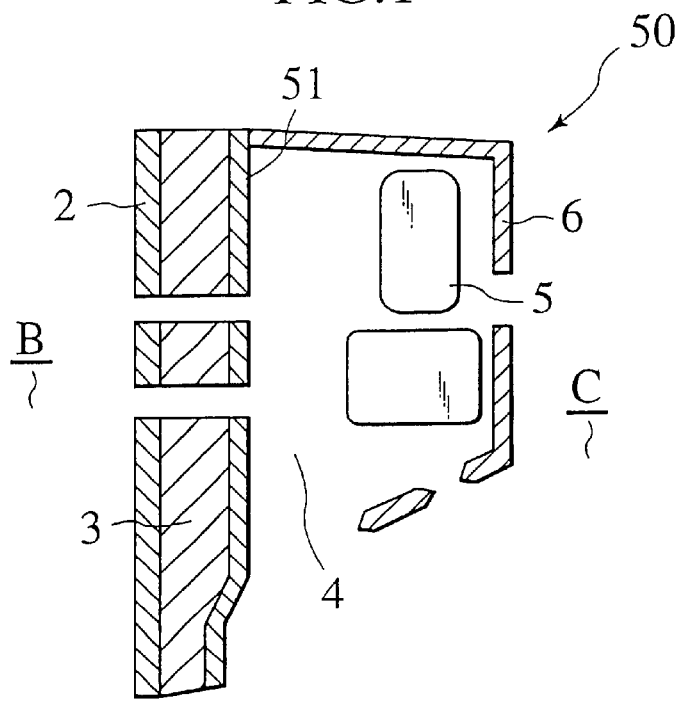
FIG. 1 is a schematic cross sectional view of a sound absorbing and shielding structure of the type having a four-layered configuration according to the related art.

FIG. 1 illustrates a sound absorbing structure 50 of the related art, with like parts bearing the like reference numerals as those used in FIGS. 5 and 6. The sound absorbing structure 50 is constructed having a sound absorbing material layer 3 whose surface is covered with a cover material 51 made of plastic having non-ventilating property, with the partition wall, which bisect the vehicle body from the engine compartment B to the passenger compartment C, being composed of the first panel layer 2 and the instrument panel being composed of the second panel layer 6 in the passenger compartment C so as to confine the sound absorbing material layer 3, the cover material 51 and the air layer 4.

That is, with such a configuration in the sound absorbing structure of the related art, the presence of the cover material 51 having non-ventilating property causes the sound, which transmits through the cover material 51, not to be absorbed again with the cover material 51. On the contrary, the purpose of a particular configuration of the sound absorbing and shielding structure 1 of the present invention resides in that the cover material 51 is dispensed with and instead thereof a cover material having a ventilating property may be employed so as to allow the sound penetrating through the sound absorbing material layer 3 and incident on the second panel layer 6 to be reflected back from the same to be incident on and to be effectively absorbed by the sound absorbing material layer 3 for thereby providing an improved sound absorbing and shielding performance.

In the illustrated embodiment, it is desired that the second panel layer 6 is made of plastic having a non-ventilating property that has a surface density ranging from 0.5 to 10 kg/m$^2$ and has the through-bores with an opening rate ranging from 1 to 50% while maintaining a surface ratio between the second panel layer 6 and the sound absorbing layer 3 to be in a value ranging from 1:5 to 5:1. That is, as the second panel layer 6 has the ventilating property except for the through-bores, the sound penetrates through the panel layer 6 with a resultant inadequate sound shielding property. With the surface ratio of the second panel layer 6 relative to the sound absorbing material layer 3 selected at a value below 0.5 kg/m$^2$, the second panel layer 6 has a degraded shape retaining property to disenable the sound absorbing and shielding structure to be maintained in a desired shape. In contrast, with the surface density of the second panel layer 6 selected at a value beyond 10 kg/m$^2$, the total weight of the sound absorbing and shielding structure exceeds an undesired excessive level. Preferably, the presence of the panel layer 6 with the surface density ranging from 3 to 5 kg/m$^2$ ensures an adequate shape retaining property while enabling the sound, which penetrates through the sound absorbing material layer 3, to be effectively reflected back thereto for thereby enhancing the adequate sound shielding performance.

Also, the presence of the second panel layer 6 having the opening rate below 1% disenables the second panel layer 6 to mount the component parts especially in a case where the second panel layer 6 is used as the sound absorbing and shielding structure of the automotive vehicle. The presence of the second panel layer 6 having the number of the through-bores with the opening rate beyond 50% causes the second panel layer 6 not to shield the sound with a resultant degraded sound absorbing and shielding performance. Preferably, it is found to be desirable for the second panel layer 6 to have the opening rate ranging from 5 to 40% and more preferably ranging from 10 to 30%, enhancing an adequate mounting space for various components parts while ensuring the adequate sound shielding performance.

The term "through-bores" used in the description of the illustrated embodiment refer to apertures. The air layer 4 involves an air space that is defined between the sound absorbing material layer 3 and the second panel layer 6. For example, in FIG. 6, the sound absorbing material layer 3 and the second panel layer 6 have a disconnected portion wherein a lower distal edge of the second panel layer 6 is not connected to the sound absorbing material layer 3 to define a lower opening. This lower opening seems to be part of the openings of the second panel layer 6 but is not counted as one of the through-bores of the same.

With the surface ratio between the surface areas of the second panel layer 6 and the sound absorbing material layer 3 selected at a value below 1:5, the second panel layer 6 has a surface area which is too small to provide the adequate sound shielding effect. In contrast, if the surface ratio of the second panel layer 6 relative to the sound absorbing material layer 3 exceeds the value 5:1, the second panel layer 6 has the surface area which is too big and is not suited for use in the automotive vehicle.

By selecting the surface ratio of the second panel layer 6 relative to the sound absorbing material layer 3 in the value ranging from 1:3 to 3:1 and more preferably in the value ranging from 1:2 to 2:1, the adequate sound shielding effect is obtained and the second panel layer 6 is allowed to be suitably used in the passenger compartment of the automotive vehicle.

With the sound absorbing and shielding structure having such a surface ratio between the sound absorbing material layer and the second panel layer, there is no need for both the sound absorbing material layer 3 and the second panel layer 6 to be fabricated in flat shapes. Both components may be configured in any shapes so as to conform to the shape of the outermost panel layer formed in a vehicular body profile or to the shape of the instrument panel. Since, in this event, there are some differences in the respective surface areas, which are designed to remain within the aforementioned surface ratio.

It is desired that the first air layer 4 has the maximum thickness, namely, the maximum distance T1, between the second panel layer 6 and the sound absorbing material layer 3, selected in a value greater than 10% of the maximum thickened portion T0 of the sound absorbing and shielding structure 1 and that an apparent volume ratio between the content products 5, received in the air layer 4, and the first air layer 4 is selected to be within a value ranging from 10 to 90%. With the maximum thickness T1 of the air layer 4 selected at a value below 50% of the total maximum thickened portion T0, the air layer 4 provides the same effect as that obtained by the sound absorbing and shielding structure which substantially has no air layer with a resultant degraded sound absorbing and shielding performance. By selecting the volume ratio of the air layer 4 in a range beyond 30% and more preferably in the range beyond 50%, the effect of the provision of the air layer 4 is maximized to allow the sound, transmitted from the engine compartment B and incident on the second panel layer 6, to be effectively reflected back to the sound absorbing material layer 3 and to be effectively absorbed thereby.

With an apparent volume ratio of the content products 5 relative to the volume of the air layer 4 selected in a range below 10%, it is insufficient for the content products 5 to attenuate the sound owing to inadequate interfering of the sound among the content products 5 with a resultant degradation in the sound absorbing effect. This issue is addressed by selecting the apparent volume ratio of the content products 5 to be in a range beyond 40% and more preferably 50% to provide an improved sound absorbing effect. Further, with the apparent volume ratio of the content products 5 in the air layer 4 in a range beyond 90%, the presence of the large number of the content products 5 decreases the propagation path of the sound to be reflected back to the sound absorbing material layer 3, lowering the amount of improvement over the sound absorbing and shielding performance.

A second preferred embodiment of the sound absorbing and shielding structure according to the present invention is described with reference to FIG. 7, with like parts bearing the same reference numerals as those used in FIGS. 5 and 6.

Figure 7:
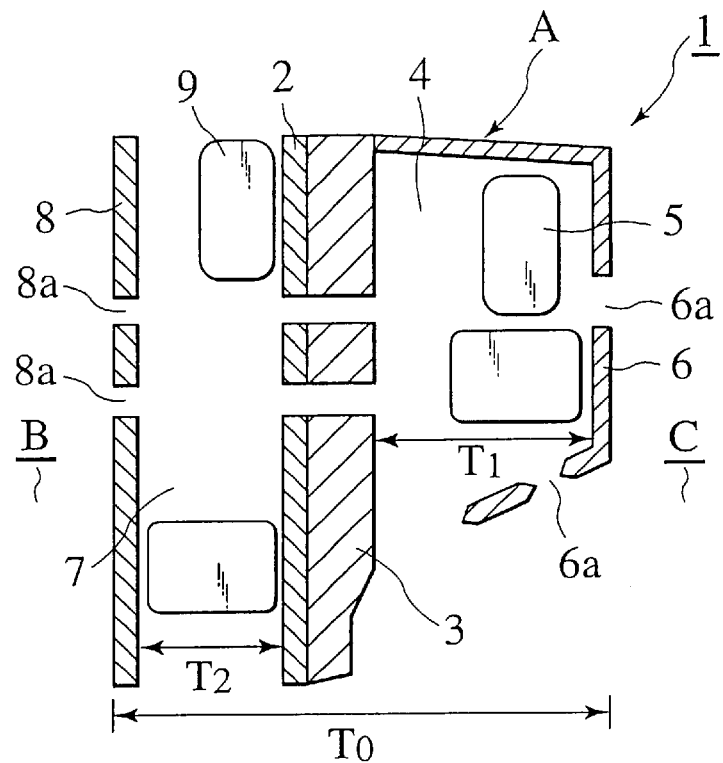
FIG. 7 is an enlarged cross sectional view of a second preferred embodiment of a sound absorbing and shielding structure of the six-layered configuration, having a single-layered sound absorbing material layer according to the present invention.

In FIG. 7, the sound absorbing and shielding structure 1 further includes a second air layer 7 and a third panel layer 8 which are located at the side of the source of sound. In particular, the sound absorbing and shielding structure 1 of FIG. 7 is constructed having at least six layers composed of the third panel layer 8, the second air layer 7, the first panel layer 2, the sound absorbing material layer 3, the first dead air space 4 and the second panel layer 6 which are sequentially arranged from the engine compartment which serves as the source of sound, with these components being particularly configured in a manner as will be described below to further improve the sound absorbing and shielding performance.

First, it is desired that the first and third panel layers 2 and 8 have no ventilating properties. The presence of the ventilating properties in these panel layers loses the sound shielding property, inevitably causing a tendency to remarkably lower the operating performance of the sound absorbing and shielding structure.

Further, it is desired that the distance between the first and third panel layers 2 and 8, namely, the thickness T2 of the second air layer 7 is selected in a range from 10 to 60% of the whole thickness T0 of the sound absorbing and shielding structure 1. With such a distance between the first and third panel layers 2 and 8, the thickness of the sound absorbing and shielding structure 1 is increased with a resultant remarkably improved sound absorbing and shielding performance. With the thickness T2 of the second air layer 7 in the range below 10%, even when the second air layer 7 is provided between the first and third panel layers 2 and 8, the presence of the second air layer 7 degrades the sound absorbing and shielding performance and disenables inner component parts 9 to be located. In contrast, with the thickness T2 of the second air layer 7 in the range beyond 60%, not only the layout designing of the engine room B becomes hard to achieve but also the distance between the opposing panel layers becomes too far away from one another, causing the sound transmitted to the first air layer 4 to increase with a degraded improvement over the sound shielding performance. With the thickness T2 of the second air layer 7 preferably selected in the value ranging from 20 to 50% relative to the whole thickness T0 of the sound absorbing and shielding structure, it is possible for the sound absorbing and shielding structure to provide a further remarkably improved performance while providing an ease of layout in the arrangement of the content products 9.

In FIG. 7, the content products 9 have the volume ratio in a value ranging from 10 to 90% relative to that of the second air ratio 7. With the volume ratio of the content products 9 in the range below 10%, the presence of inadequate ventilating resistance caused in the second air layer 7 degrades the sound shielding performance. Also, with the volume ratio of the content products 9 in the second air layer 7 in the range beyond 90%, the presence of a large number of the content products 9 remaining in the second air layer 7 undesirably increases the number of solid propagation components for vibration and sound. The second panel layer 6 has the same configuration as those obtained in the sound absorbing and shielding structure of the first preferred embodiment to provide the similar improved performance.

Preferably, the minimum thickness portion of the sound absorbing material layer 3 is designed to have the coefficient of bending elasticity at a value ranging from 100 to 2000 kPa. With such a minimum thickness portion of the sound absorbing material layer 3 having the coefficient of bending elasticity in the range below 100 kPa, not only the shape of the sound absorbing material layer 3 becomes hard to maintain but also the sound absorbing material layer 3 is readily deformed to provide a troublesome handling work during assembling of the same into the vehicle body. In contrast, with the minimum thickness portion of the sound absorbing material layer 3 having the coefficient of bending elasticity in the range beyond 2000 kPa, not only the weight of the sound absorbing material layer 3 remarkably increases due to an excessively increased surface density but also a fabrication workability of the sound absorbing material layer 3 becomes inefficient. Preferably, the minimum thickness portion of the sound absorbing material layer 3 is determined to have the coefficient of bending elasticity in a value ranging from 500 to 1500 kPa to provide an improved fabricating efficiency.

Also, the sound absorbing material layer 3 may be composed of a multi-layered structure including at least two layers of different apparent densities. Although the sound absorbing material layer 3 made of a single layer having a particular density provides the sound absorbing effect, a further improved sound absorbing effect is obtained by constructing the sound absorbing material layer 3 with laminated layers of different densities to provide a double-wall type sound shielding structure having a further improved sound shielding performance. In this instance, the layer component in the high density side may be fabricated with a fibrous layer having a ventilating property.

Figure 8:
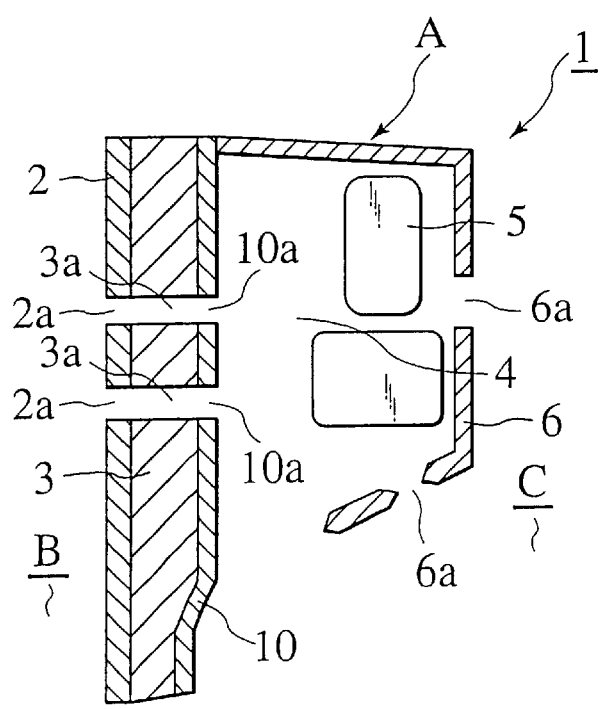
FIG. 8 is an enlarged cross sectional view of a third preferred embodiment of a sound absorbing and shielding structure of the four-layered configuration, having a sound absorbing material layer including a high density layer made of fibers according to the present invention.

FIG. 8 shows a schematic cross sectional view of a third preferred embodiment of a sound absorbing and shielding structure 1 according to the present invention which employs the sound absorbing material layer 3 of the two-layered structure discussed above. In the sound absorbing and shielding structure 1 of this illustrated embodiment, the sound absorbing material layer 3 includes a high density layer 10 made of fibrous material and serving as a sound absorbing material. In FIG. 8, although the sound absorbing and shielding structure is shown as having the high density layer 10 located at the side of the first air layer 4, the high density layer 10 may be located at the side of the first panel layer 2.

With such a sound absorbing material layer 3 of the multi-layered structure, since the presence of the high density layer 10, which has the ventilating property, in the first air layer 4 allows the sound to be absorbed by the sound absorbing material layer 3 again, the sound absorbing material layer 3 may have a layer of non-ventilating property located at the side of the first panel layer 2.

Figure 9:
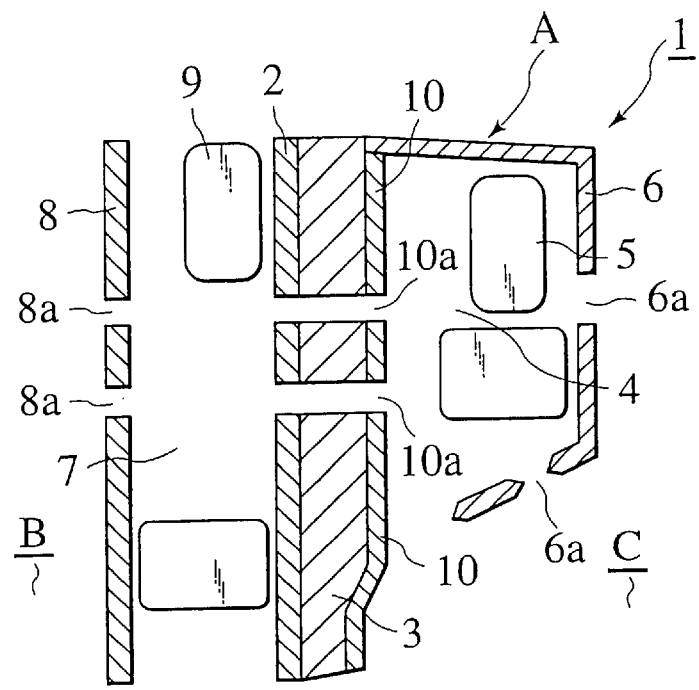
FIG. 9 is an enlarged cross sectional view of a fourth preferred embodiment of a sound absorbing and shielding structure of the six-layered configuration, having a sound absorbing material layer including a high density layer made of fibers according to the present invention.

FIG. 9 shows a schematic cross sectional view of a fourth preferred embodiment of a sound absorbing and shielding structure according to the present invention which combines the sound absorbing material layer 3 of the two-layered structure with the sound absorbing and shielding structure 1 of FIG. 7 discussed above.

In the sound absorbing material layer 3 of the two-layered structure, the maximum thickness region of the high density layer 10 is selected to have the coefficient of bending elasticity in a value ranging from 1 to 500 Mpa and more preferably in a value ranging from 5 to 300 Mpa with a resultant enhancement in the profile retaining property as well as the processing efficiency of the sound absorbing material layers 3 and 10. In general, since the high density layer 10 is formed to have a smaller thickness than the sound absorbing material layer 3, the high density layer 10 is needed to have a higher coefficient of bending elasticity than the sound absorbing material layer 3 in order to maintain its shape or profile.

In the sound absorbing material layer 3 of the multi-layered structure, the high density layer 10 may be made of plastic and have openings with an opening rate of a value ranging from 1 to 80% relative to the surface area of the sound absorbing material, except for the through-bores which enables the other component parts to be mounted therein.

Figure 10:
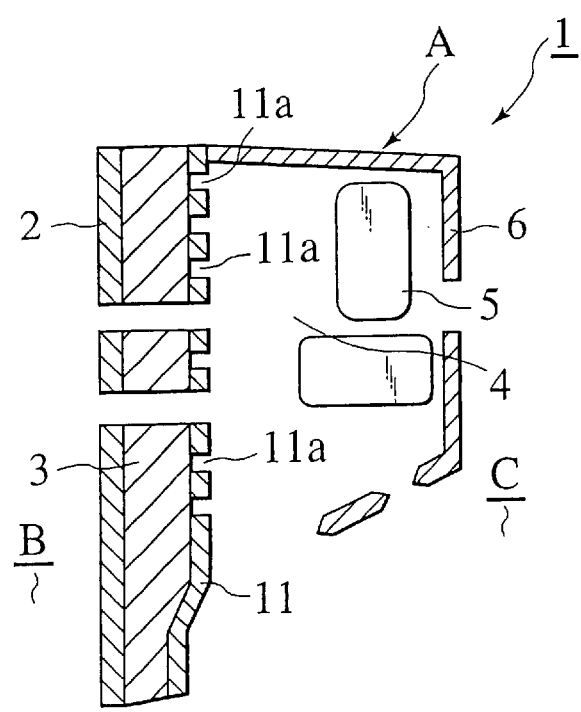
FIG. 10 is an enlarged cross sectional view of a fifth preferred embodiment of a sound absorbing and shielding structure of the four-layered configuration, having a single-layered sound absorbing material layer composed of a high density layer made of plastic according to the present invention.
Figure 11:
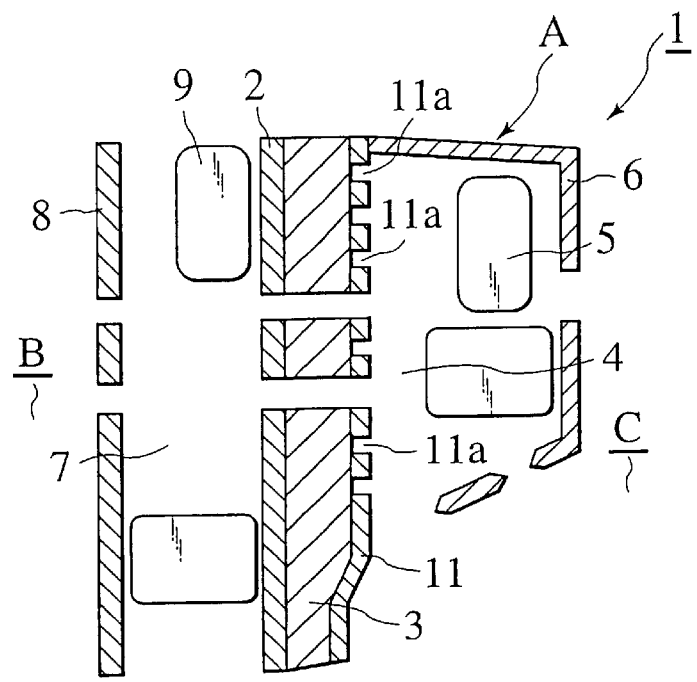
FIG. 11 is an enlarged cross sectional view of a sixth preferred embodiment of a sound absorbing and shielding structure of the four-layered configuration, having a single-layered sound absorbing material layer composed of a high density layer made of plastic according to the present invention.

FIGS. 10 and 11 show schematic cross sectional views of fifth and sixth preferred embodiments of sound absorbing and shielding structures according to the present invention, both of which employ the sound absorbing material layer 3 of the two-layered structure discussed above. In these illustrated embodiments, the high density layer 11, which is made of plastic, has a plurality of openings 11a to allow the sound to be absorbed by the sound absorbing material layer 3 again. The respective openings 11a may have any shapes or any sizes, and any number of openings 11a may be formed. Thus, the openings 11a may have any arbitrary shapes unless a degraded forming efficiency and profile retaining property are obtained.

With such a sound absorbing material layer 3 combined with the high density layer 11 made of plastic, the presence of the openings 11a with the opening rate in a value of more than 1% allows the sound absorbing material layer 3 to provide a remarkably increased sound absorbing performance than that obtained in the related art practice with the high density layer made of plastic without the openings. In contrast, with the high density layer 11 made of plastic with the opening rate beyond 80%, the sound absorbing material layer 3 has the sound absorbing and shielding performance which is substantially equal to that obtained with the sound absorbing material layer 3 made of the single layer, the high density layer made of plastic has no merits on the performance. Preferably, the opening rate of the high 10 density layer 11 is determined to have a value ranging from 20 to 50% to allow the sound absorbing material layer 3 of the multi-layered structure including the plastic layer to ensure an improved sound absorbing and shielding performance. Note should be undertaken here that the term "plastic" means a plastic material which is generally used as a cover material made of a sheet of polyvinyl chloride resin or rubber.

The second panel layer 6 may also have a multi-layered structure wherein at least one layer is made of a fibrous layer.

Figure 12:
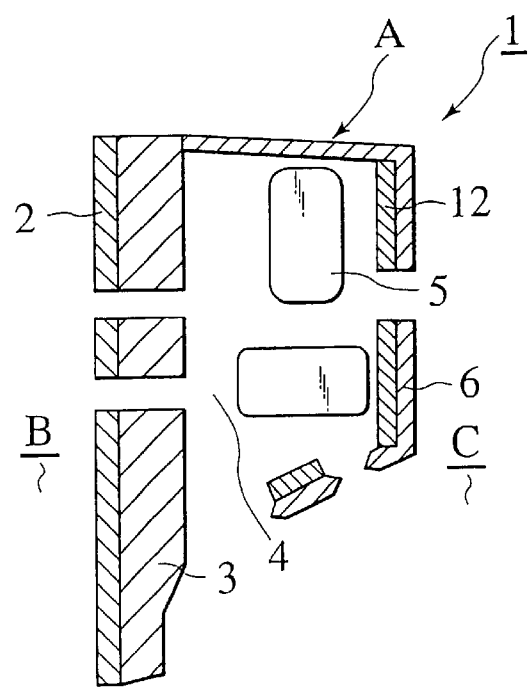
FIG. 12 is an enlarged cross sectional view of a seventh preferred embodiment of a sound absorbing and shielding structure of the four-layered configuration, having a second panel layer including a fibrous layer according to the present invention.
Figure 13:
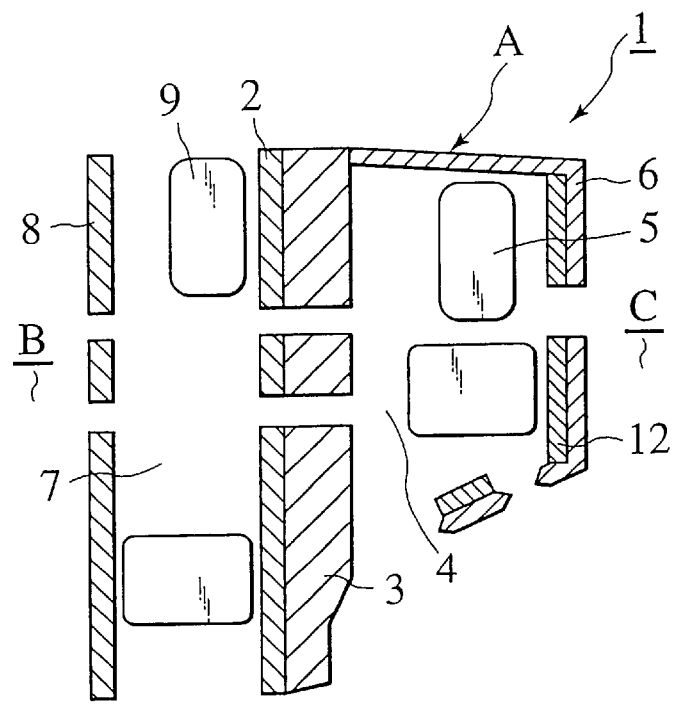
FIG. 13 is an enlarged cross sectional view of an eighth preferred embodiment of a sound absorbing and shielding structure of the six-layered configuration, having a second panel layer including a fibrous layer according to the present invention.

FIGS. 12 and 13 show schematic cross sectional views of seventh and eighth preferred embodiments of a sound absorbing and shielding structure 1 according to the present invention which employs such a second panel layer 6 of the multi-layered structure discussed above. In the illustrated embodiments of FIGS. 12 and 13, the second panel layer 6 has an inner fibrous layer 12 by which 25 a sound absorbing performance is added to the second panel layer 2 to further improve the sound absorbing and shielding performance.

The fibrous layer 12 may also be located in the first air layer 4 defined between the sound absorbing material layer 3 and the second panel layer 6, in the second air layer 7 defined between the first and third panel layers 2 and 8 or in both the first and second air layers 4 and 7, resulting in an additionally improved sound attenuating performance due to the sound attenuation effect, caused by reflection of the sound from the content products 5, as well as a newly added sound absorbing effect of the fibrous layer 12.

Figure 14:
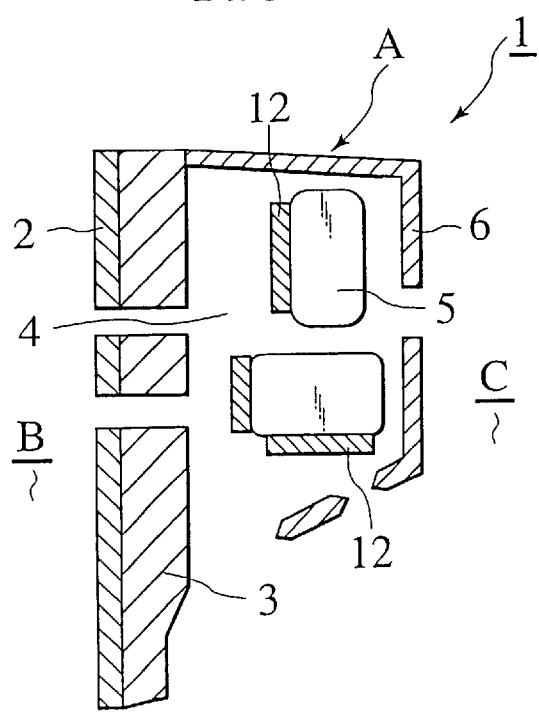
FIG. 14 is an enlarged cross sectional view of a ninth preferred embodiment of a sound absorbing and shielding structure of the four-layered configuration, having content products provided with respective fibrous layers in a first air layer according to the present invention.
Figure 15:
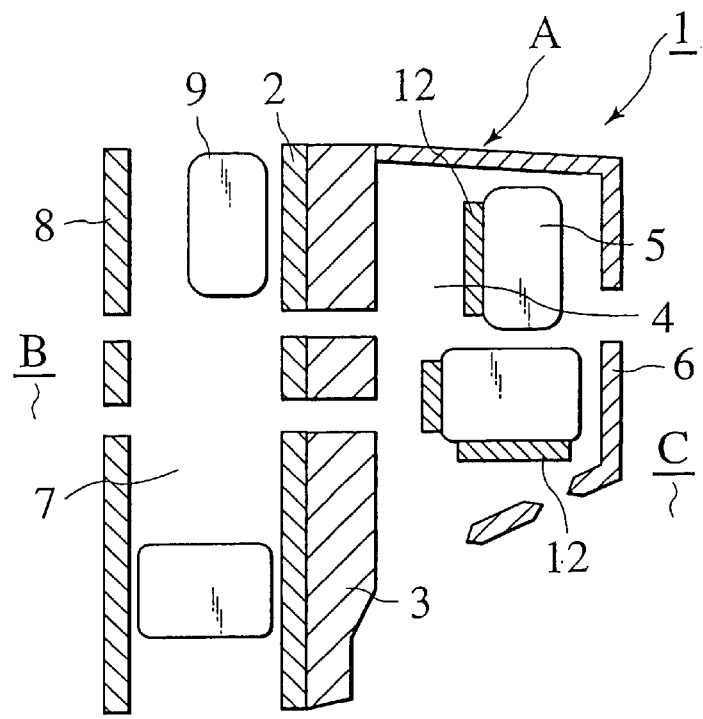
FIG. 15 is an enlarged cross sectional view of a tenth preferred embodiment of a sound absorbing and shielding structure of the six-layered configuration, having content products provided with respective fibrous layers in a first air layer according to the present invention.

FIGS. 14 and 15 show schematic cross sectional views of ninth and tenth preferred embodiments of a sound absorbing and shielding structure 1 according to the present invention wherein the fibrous layers 12 are attached to surfaces of the respective content products 5 by means of adhesive agent in the first air layer 4. The presence of these fibrous layers 12 provides an additional sound absorbing performance in the first air layer 4. Also, in FIG. 15, although the sound absorbing and shielding structure 1 has been shown as an example that includes the fibrous layers 12 mounted only to the content products 5 in the first air layer 4, the fibrous layers 12 may also be mounted to the content products 9 located in the second air layer 7.

The fibrous layers to be used in the sound absorbing and shielding structures 1 described above, namely, the high density layer 10 of the sound absorbing layer of the multi-layered structure and the fibrous layers 12 of the second panel layer 6 and the content products 5 and 9 may be formed of fibers having a diameter ranging from 5 to 100 μm, a fiber length of 30 to 100 mm with the mass of short fibers being selected in a value ranging from 50 to 95%, and the mass of adhesive agent in a value ranging from 5 to 50%. Preferably, the fibers to be used as the fibrous layers are formed of polyester fibers as main components because of its mechanical strength, its processing efficiency and its market circulation.

In illustrated embodiments of the present invention, the polyester material may involve for example polyethylene terephthalete (PET), polybutylene terephthalate (PBT), polyethylene naphthalate (PEN), polybutylene naphthalate (PBN), polyethylene isophthalate (PEI), polybutylene isophthalate (PBI) and polycaprolactone (PCL), etc, polyester compound (such as for example polyhexamethylene terephthalate (PHT)) wherein ethylene glycol compound is substituted with other glycol compounds (such as for example polyhexamethylene terephthalate (PHT)), polymer compound (such as for example polyhexamethylene isophthalate (PHI) and polyhexamethylene naphthalate (PHN)) wherein terephthalic acid compound is substituted with other 2-basic salt compounds. Further, the polyester may also involve copolymer polyester, which consists of the aforementioned constituents, such as block copolymer of PBT and polytetramethylene glycol (PTMG), copolymer of PET and PEI, copolymer of PBT and PBI and copolymer of PBT and PCL and may consist of copolymer which consists of main repetitive units of polyester. The adhesive component desirably consists of binder fibers or a core type or a side-by-side type but is not limited to these components.

In the event that the fibrous material is formed of a felt, although a thermosetting resin is generally used as the adhesive component without any issues, it is also possible to employ the thermosetting resin or the binder fibers.

In actual practice, the sound absorbing and shielding structure of at least the four layers is located in the passenger compartment C of the automotive vehicle. In this instance, the body panel or the dash panel of the automotive vehicle may be constructed of the first panel layer of the sound absorbing and shielding structure according to the present invention to be effective for providing an improved quiet circumstance in the passenger compartment. The body panel of the automotive vehicle, which corresponds to the first panel layer of the sound absorbing and shielding structure, may be formed of either a metallic panel or a plastic panel and may not be limited to either one of these components. Also, the body panel of the automotive vehicle may further be attached with a vibration control material such as a male sheet.

Likewise, the sound absorbing and shielding structure composed of at least six-layered components according to the present invention may also be installed in the passenger compartment C of the automotive vehicle such that the partition wall between the engine room B and the passenger compartment C of the automotive vehicle is constructed of the first panel layer to be highly effective to provide a quiet circumstance in the passenger compartment. The body panels such as the first and third panel layers may be constructed of either the metallic panel or the plastic panel and may not be limited to either one of these components. Similarly, the body panel may also be attached with the vibration control material such as the male sheet.

Figure 16:
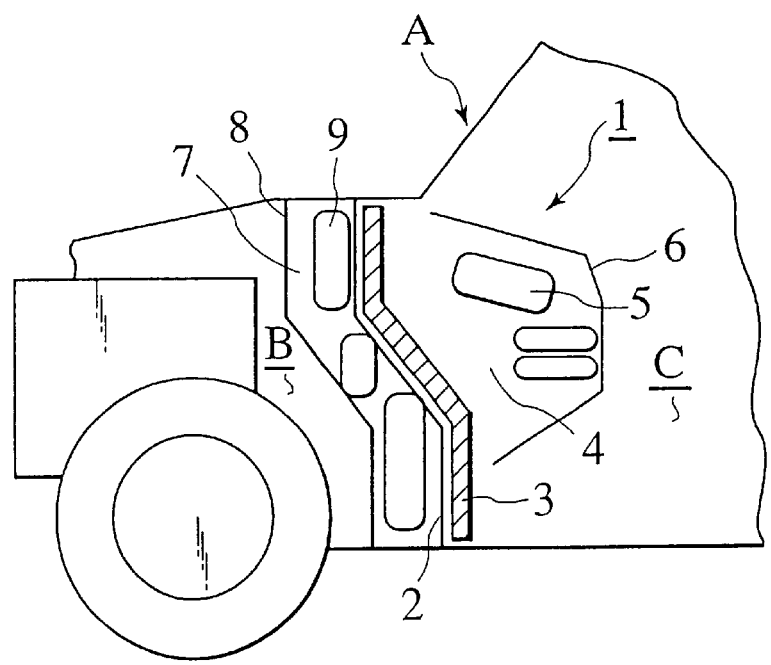
FIG. 16 is a cutaway view of an automotive vehicle employing the sound absorbing and shielding structure of the six-layered configuration shown in FIG. 15.
Figure 17:
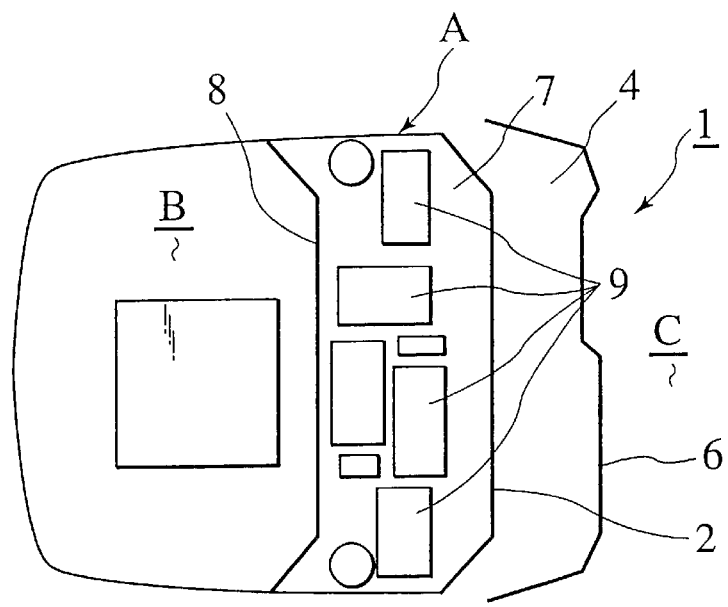
FIG. 17 is a horizontal cutaway view of the automotive vehicle for illustrating the sound absorbing structure shown in FIG. 16.

FIGS. 16 and 17 show schematic cross sectional view and horizontal cross sectional view, respectively, of the automotive vehicle employing the sound absorbing and shielding structure 1 of the six-layered structure.

In FIGS. 16 and 17, the body panel forming part of the vehicle body A, namely, the dash panel is constructed of the third panel layer 8 forming part of the sound absorbing and shielding structure 1 and the partition wall member, which bisects the vehicle body A from the engine room B to the passenger compartment C, is constructed with the first panel layer 2, with the second air layer 7 being confined with a thickness T2, which exceeds the value of 10% of the whole thickness To of the sound absorbing and shielding structure 1, between the first and third panel layers 2 and 8 while locating the sound absorbing material layer 3 and the first air layer 4 in the passenger compartment C wherein the instrument panel is constructed with the second panel layer 6.

FIG. 17 shows the positional relationship of the panel layers 8, 2 and 6 and the first and second air layers 4 and 7 located in a horizontal plane.

Figure 18:
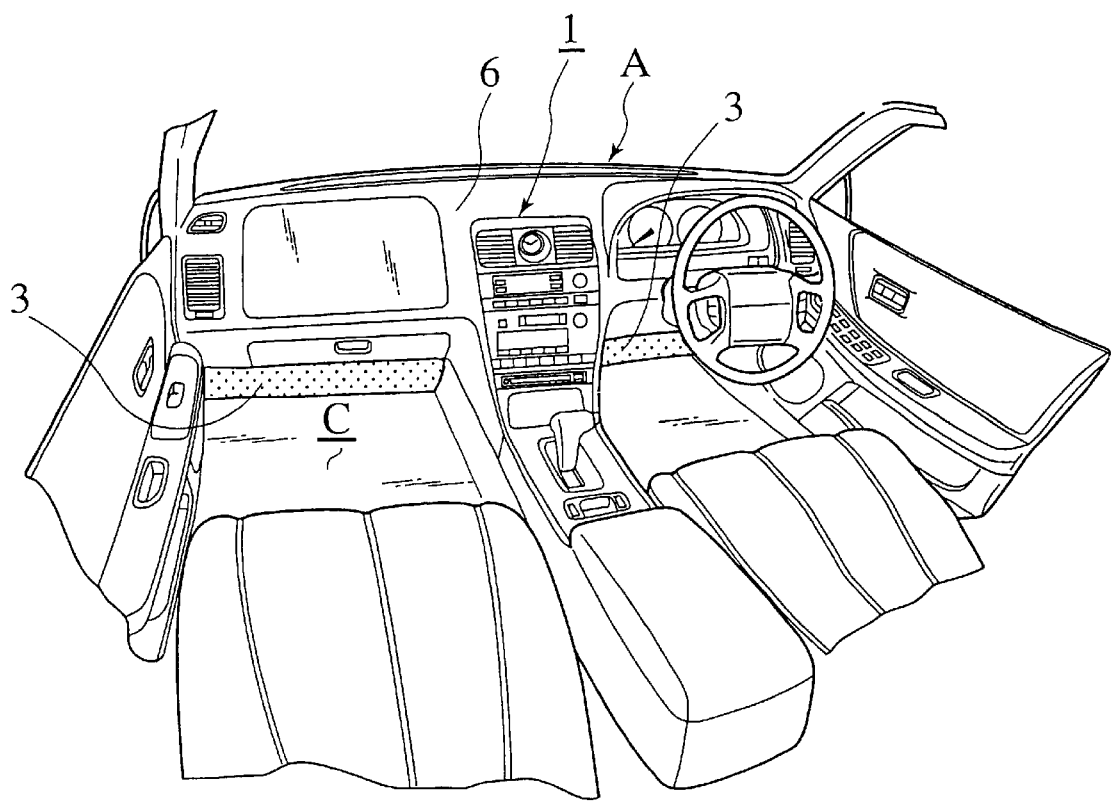
FIG. 18 is a perspective view of the automotive vehicle showing a passenger compartment for illustrating an installed state of the sound absorbing and shielding structure shown in FIG. 16.

FIG. 18 is an enlarged perspective view for illustrating the vehicle body A of the automotive vehicle incorporating the sound absorbing and shielding structure 1 of the present invention. In FIG. 18, only a part of the instrument panel constructed of the second panel layer 6 and a part of the sound absorbing material layer 3 are seen in the passenger compartment C of the vehicle body A.

Figure 2:
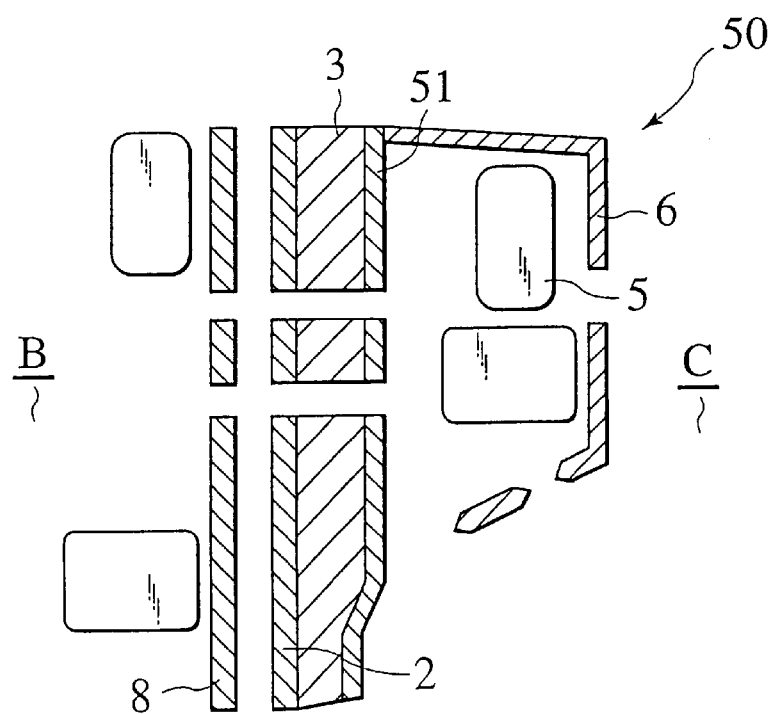
FIG. 2 is a schematic cross sectional view of a sound absorbing and shielding structure of the type having a six-layered configuration according to the related art.
Figure 3:
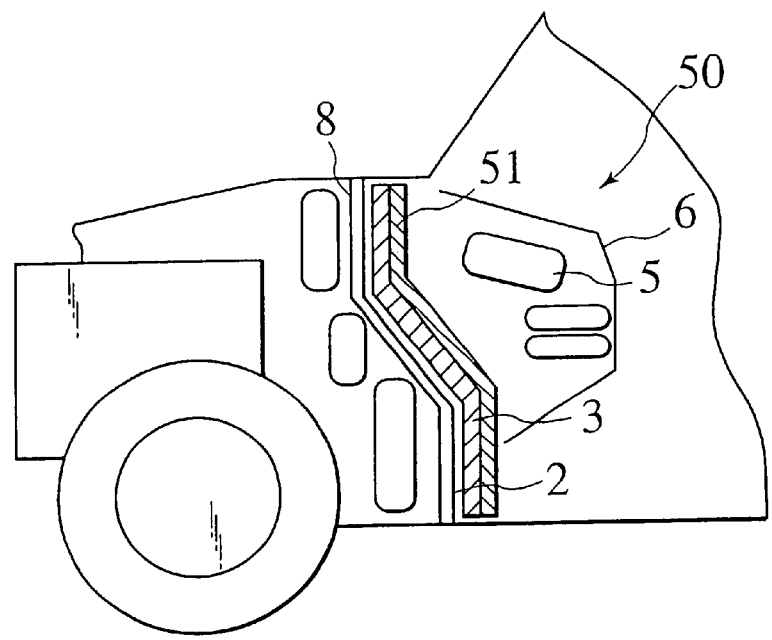
FIG. 3 is a partial cutaway view of an automotive vehicle employing the sound absorbing and shielding structure of the six-layered configuration according to the related art.
Figure 4:
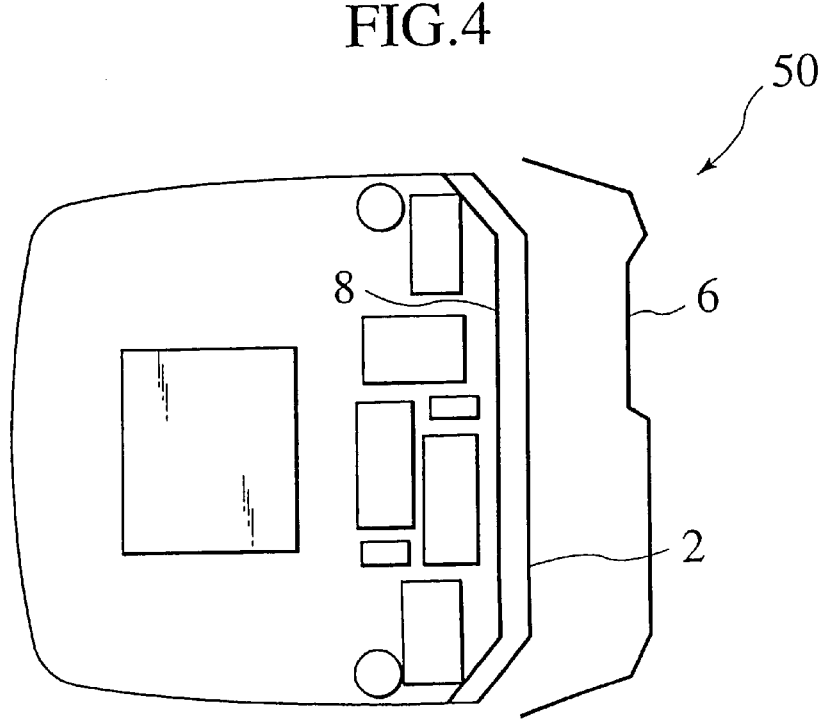
FIG. 4 is a horizontal cutaway view of the automotive vehicle for illustrating the sound absorbing structure shown in FIG. 3.

FIGS. 2 and 3 show the sound absorbing and shielding structure of the six-layered structure of the related art wherein the first and third panel layers 2 and 8 are closely spaced from one another within a range below 10% of the whole thickness of the sound absorbing and shielding structure 50 and wherein the surface of the sound absorbing material layer 3 is backed with the cover material 51 made of plastic having the non-ventilating property.

Figure 19:
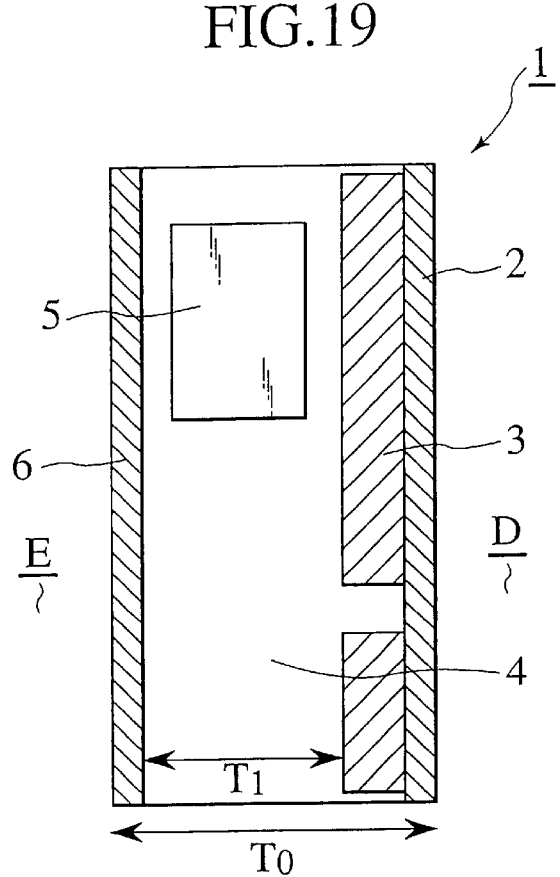
FIG. 19 is an enlarged cross sectional view of an eleventh preferred embodiment of a sound absorbing and shielding structure according to the present invention.

FIG. 19 is a schematic cross sectional view of an eleventh preferred embodiment of a sound absorbing and shielding structure according to the present invention. As shown in FIG. 19, the sound absorbing and shielding structure 1 includes a first panel layer 2, a sound absorbing material layer 3, a first air layer 4 and a second panel layer 6 which are sequentially located from a source D of sound. In particular, the sound absorbing and shielding structure 1 further includes at least one content product 5 that has a volume ratio in a value ranging from 10 to 90% relative to the total volume of the sound absorbing material layer 3 and the first air layer 4. Preferably, the sound absorbing and shielding structure 1 further features that a predefined total surface area of the sound absorbing material layer 3 has a value ranging from 5 to 90% relative to the surface area of the second panel layer 6; that a predefined total thickness T1 of the first air layer 4 has a value ranging from 3 to 70% of the maximum thickness T0 of the sound absorbing and shielding structure 1; that the first panel layer 2 has throughbores with an opening rate of 1 to 50% relative to the total surface area of the first panel layer 2 and a ventilating area, except for the through-bores, with a value ranging from 30 to 100% in a surface density of 0.5 to 10 $kg/m^2$. That is, as the mass of the second panel layer 6 increases, the sound shielding performance basically increases because the second panel layer 6 improves the sound shielding performance for the sound transmitted to the sound absorbing and shielding structure from outside owing to a mass principle. However, when taking a consideration for the case of the sound absorbing and shielding structure to be applied in the automotive vehicle, although the surface density of the second panel layer 6 is desirably determined in the value ranging from 0.5 to 10 $kg/m^2$, this value is not limited thereto. Further, although the second panel layer 6 is basically made of a steel plate or a plastic plate with no ventilating property, with the thickness of the steel plate being selected in a range from 0.2 to 2.0 mm while the thickness of the plastic plate is selected in a range from 0.5 to 20 mm, the thickness of the second panel layer 6 is not limited to the above values.

Since the first panel layer 2 forms part of a double-wall sound shielding structure that includes the second panel layer 6, the first panel layer 2 should desirably have a high surface density like the second panel layer 6 for the purpose of improving the sound absorbing and shielding performance. In order to further improve the sound absorbing and shielding performance, it is desired that the surface densities of the first and second panel layers 2 and 6 are selected to be as close as possible. The maximum performance will be obtained when the surface densities of both the panel layers are equal to one another due to the fact that the double-wall sound shielding structure has the lowest primary resonant frequency.

Figure 20:
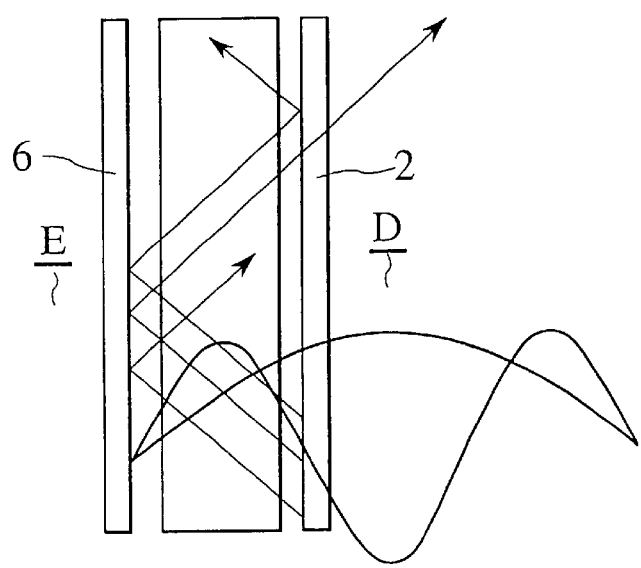
FIG. 20 is a view for illustrating a sound absorbing and shielding mechanism for the sound absorbing and shielding structure shown in FIG. 19.

Also, it is desired that the first panel layer 2 or the second panel layer 6 have the ventilating property except for that of the through-bores. This is based on the fact that, as shown in FIG. 20, it is possible for the drop in the sound absorbing and shielding performance in terms of the primary resonant frequency of the double-wall sound absorbing and shielding structure to be improved by providing the ventilating property to one of the two panel layers. The one of the panel layers, which has no ventilating property, serves as a rigid end to reflect the sound incident thereon while the other panel layer having the ventilating property remaining in a stomach zone of the resonant frequency, resulting in a remarkably improved sound absorbing and shielding performance. The presence of the maximum particle velocity at the stomach zone of the resonant frequency causes a friction to increase between the sound and the panel layer having the ventilating property with a resultant remarkable reduction in sound energy for thereby improving the sound absorbing and shielding performance.

In this instance, it is desired that the panel layer having the ventilating property is constructed with the first panel layer 2. That is, the sound to be transmitted to an area E is attenuated because of a particular arrangement wherein the rigid end is located in a position remotest from the source D of sound while the panel layer 2 having the ventilating property is located in a position closest to the source D of sound to allow a portion of the maximum particle velocity of the sound to be located in the panel layer 2 having the ventilating property. From the point of attenuation of the sound, it is not desirable for both the panel layers to have the ventilating properties because of the absence of the rigid end in either of the panel layers to cause the portion of the maximum particle velocity of the sound to be hardly located in the panel layer 2 having the ventilating property.

Preferably, the through-bores of the first panel layer 2 have the opening rate ranging from 1 to 50% relative to the whole surface area of the first panel layer 2. That is, with the first panel layer 2 having the opening rate below 1%, it is difficult for the first panel layer 2 to have an adequate area for mounting other components parts such as a sound absorbing material layer. Thus, it is impractical. With the first panel layer 2 having the opening rate beyond 50%, the total surface area of the through-bores becomes too big with a resultant degraded sound absorbing and shielding performance.

Preferably, the first panel layer 2 has an effective surface area, having the ventilating property, in a value ranging from 30 to 100% relative to the whole surface area of the first panel layer 2, except for an occupied area of the through-bores, and has a surface density ranging from 0.5 to 10 kg/m². Note should be taken here that "the effective surface area except for the occupied area of the through-bores" means a usual surface area that generally forms a layer, and that an area, in which the usual surface area has the ventilating property, is selected to have a value ranging from 30 to 100% relative to the whole area of the usual surface area. As the sound absorbing and shielding performance increases with the increase in the surface area through which the sound passes at the maximum particle velocity, it is preferable for the first panel layer 2 to have the ventilating portion in a largely sized area. With the surface area of the ventilating portion in a range below 30%, there is no great difference in merit for the sound absorbing and shielding performance even with the provision of the panel layer having the ventilating property. Particularly from a point of view of the improved performance, the first panel layer 2 should have the surface area, having the ventilating property, in a range above 50%, relative to the whole surface area of the first panel layer 2, which is effective for improving the sound absorbing and shielding performance. With the surface density of the first panel layer 2 in the range below 0.5 kg/m², it is difficult for the first panel layer 2 to ensure the sound absorbing and shielding performance. With the surface density of the first panel layer 2 in the range beyond 10 kg/m², the whole weight of the sound absorbing and shielding structure 1 is inevitably increased. In order to have a compatibility for the improved performance and the weight-lightening property of the structure, the surface density of the first panel layer 2 is selected in a value ranging from 0.5 to 10 kg/m².

Preferably, the first panel layer 2 should have the ventilating property which allows the ventilating air to pass at an amount of ventilating air ranging from 1 to 10 cm³/(cm²·sec) at a minimum thickness area. Note should be taken here that "the amount of ventilating air" represents the volume of air passing through a unit area per one second under a unit pressure and is expressed as a unit (cm³/(cm²·sec)) that is designated by JIS (Japanese Industrial Standard) L1004. In order for the sound absorbing and shielding performance to be improved, it is required for the sound to pass through the first panel layer 2 to cause a friction to occur between the air and the first panel layer 2 for thereby attenuating the sound energy. In this instance, the presence of the friction between the air and the first panel layer 2 selected in a suitable range is suited for effectively improving the sound absorbing and shielding performance. With the amount of ventilating air in the range below 1 cm³/(cm²·sec), the reflection rate of the sound increases with a resultant degradation in the sound absorbing and shielding performance. In contrast, with the amount of ventilating air in the range beyond 10 cm³/(cm²·sec), the rate of the sound, which passes through the first panel layer 2, increases with a resultant degraded sound absorbing and shielding performance.

It is desired that the coefficient of bending elasticity at the minimum thickness region of the effective surface area, which has the ventilating property, of the first panel layer 2 is selected to have a value ranging from 500 to 1500 kPa. In order to improve the sound absorbing and shielding performance, it is needed for the panel layer of the sound absorbing and shielding structure to have a surface rigidity to allow the coefficient of the bending elasticity, which is basically an index of the surface rigidity, to preferably have a higher value. However, when manufacturing the sound absorbing and shielding structure, since the manufacturing factors should be considered in an actual practice, a desired range of the surface rigidity is determined to have a value selected from a view point of the sound absorbing and shielding performance and the forming efficiency. That is, with the first panel layer 2 having the coefficient of bending elasticity with the value below 500 kPa, the rigidity of the first panel layer 2 is too low to resist the sound pressure in terms of the surface rigidity to maintain the high sound absorbing and shielding performance. With the first panel layer 2 with the coefficient of bending elasticity with the value beyond 1500 kPa, it is required for the first panel layer 2 to have an increased surface density resulting in an increase in the weight of the same which is contrary to the weight-lightening of the structure when it is taken into a serious consideration.

The first panel layer 2 may be desirably constructed of plural layers, at least one of which is formed of a fibrous layer. Although the presence of the first panel layer 2 composed of a single layer provides the sound attenuation effect, it is possible to effectively reduce the sound pressure for thereby further improving the sound absorbing and shielding performance by fabricating the first panel layer 2 with laminated layers of different densities. The presence of the fibrous layer adhered to the first panel layer 2 allows the first panel layer 2 to have an additional sound absorbing performance for providing a further improved sound absorbing and shielding performance.

The effective surface area, which has the ventilating property, of the first panel layer 2 is preferably formed of the fibrous layer. The fibrous body serves to effectively reduce the sound pressure to provide a further improved sound absorbing and shielding performance. In order to allow the sound absorbing and shielding performance to have a specific directivity, it is preferable to mount the fibrous layer, which has the ventilating property, to a particular part of a flat surface of the first panel layer 2.

Particularly, in the actual application of the sound absorbing and shielding structure to the automotive vehicle, it is required for the sound absorbing and shielding performance to have the maximum value at a position close to the ears of a vehicle occupant in the passenger compartment and, so, the ventilating area should be desirably located on the first panel layer 2 at a particular part thereof in the vicinity of the ears of the vehicle occupant as close as possible. Further, it is desired that the ventilating region of the first panel layer 2 is located in the shortest distance between the source of sound and the vehicle occupant.

The aforementioned fibrous layer is preferably formed of fibers containing a mass of 50 to 95% with a fiber diameter ranging from 5 to 150 μm and an adhesive component in a mass ranging from 5 to 50%. In this instance, it is desired that the diameter of the fiber is selected to be as small as possible. Since, however, the narrow fibers have a lowered rigidity, the presence of a large amount of the narrow fibers provides a decreased surface rigidity to the panel which is contrary to the improvement of the sound absorbing and shielding performance. Consequently, there is an optimum blending ratio between the diameter of the fibers and the amount of fibers to be blended, with the optimum blending ratio being provided with the mass of the fiber layer ranging from 50 to 95% wherein the fiber's diameter is within a range from 5 to 150 μm. Further, in order to allow the fiber layer to have a proper forming efficiency, it is needed to provide the adhesive component to allow the fibers to be mutually adhered to one another. Since, in this event, the fibers, except for the adhesive component, have the sound absorbing and shielding performance, an increase in the quantity of the adhesive component to be blended in the fibrous layer results in a degradation in the sound absorbing and shielding performance. On the contrary, the presence of an inadequate quantity of the adhesive component causes the fibrous layer to be hardly formed. Thus, the mass of the adhesive component is selected to be in a range from 5 to 50%.

The fibers, which constitute the fibrous layer at the ventilating region of the first panel layer 2 in an area except for the through-bores, may include natural fibers or synthetic fibers in the form of a felt. In particular, the synthetic fibers are preferred as a row material of the sound absorbing and shielding structure because of easiness in manufacturing the same products by allowing whole essential parameters, such as the fiber size, the fiber length and the distribution rate of the fibrous bodies, to be regulated. In addition, when taking the merits, which involves a recycling property of the sound absorbing material, a concurrent unitary forming property and a profiled fiber characteristic, etc, into a consideration, it is preferable to employ polyester fibers which are capable of being blended and have different melting points.

In the illustrated embodiment, as discussed above, the polyester material may involve for example polyethylene terephthalete (PET), polybutylene terephthalate (PBT), polyethylene naphthalate (PEN), polybutylene naphthalate (PBN), polyethylene isophthalate (PEI), polybutylene isophthalate (PBI) and polycaprolactone (PCL), etc, polyester compound (such as for example polyhexamethylene terephthalate (PHT)) wherein ethylene glycol compound is substituted with other glycol compounds (such as for example polyhexamethylene terephthalate (PHT)), polymer compound (such as for example polyhexamethylene isophthalate (PHI) and polyhexamethylene naphthalate (PHN)) wherein terephthalic acid compound is substituted with other 2-basic salt compounds. Further, the polyester may also involve copolymer polyester, which consists of the aforementioned constituents, such as block copolymer of PBT and polytetramethylene glycol (PTMG), copolymer of PET and PEI, copolymer of PBT and PBI and copolymer of PBT and PCL and may consist of copolymer which consists of main repetitive units of polyester. Further, although it is possible to employ the synthetic fibers such as nylon, polyacrylonitrile, polyacetate, polyethylene, polypropylene, wire-shaped polyester and polyamide, etc., the fibers are not limited to these materials.

The adhesive component desirably consists of binder fibers of a core type or a side-by-side type, but is not limited to these components. Also, in a case where a felt material is employed as the fibrous material, it is a usual practice to use the thermosetting plastic resin without any problems and the thermosetting plastic resin and the binder fibers may also be employed.

With such a sound absorbing and shielding structure constructed having the first panel layer 2, the sound absorbing material layer 3, the first dead air layer 4 and the second panel layer 6, which are located in a sequence from the source of the sound, a particular distribution pattern of the particle velocity based on the rigid end of the structure is formed between the first and second panel layers 2 and 6. In this instance, it is needed to decrease the sound pressure remaining in the particular distribution pattern for the purpose of improving the sound absorbing and shielding performance. To this end, it is advisable for the sound absorbing material layer 3, which has the sound absorbing material, to be located in a position at an arbitrary area thereof between the first and second panel layers 2 and 6. This sound absorbing material is quite effective for reducing the sound pressure. Preferably, the total surface area of the sound absorbing material layer 3 is selected to have a ratio ranging from 5 to 90% relative to the surface area of the first panel layer 2. That is, with the sound absorbing material layer 3 having the surface area below 5%, the performance of the sound absorbing and shielding structure is deteriorated. With the sound absorbing material layer 3 having the surface area beyond 90%, the volume of the first air layer 4 becomes too small to improve the sound absorbing and shielding performance.

In order to have the sound absorbing and shielding structure having a superior performance, a lower spring effect is required between the first and second panel layers 2 and 6, with a spring constant being effectively reduced with the first air layer 4. To this end, the predefined thickness of the first air layer 4 is selected to be within a range from 3 to 70% relative to the maximum thickness T0 of the sound absorbing and shielding structure. With the first air layer 4 having the thickness in the range below 3%, the spring constant of the first air layer 4 becomes too small to ensure the sound absorbing and shielding performance. With the first dead air layer 4 having the thickness in the range beyond 70%, the mounting area of the sound absorbing material layer 3 becomes too small with a resultant decrease in the sound absorbing and shielding performance. When taking the performance in the serious consideration, it is preferable to allow the first air layer 4 to have the predefined total thickness of from 15 to 50% relative to the maximum thickness of the sound absorbing and shielding structure. This is because of the fact that the presence of the predefined thickness of one or more than two dead air layers in the aforementioned range is quite effective for reducing the spring constant.

Further, it is desired that at least one content product 5 has a volume ratio in a range from 10 to 90% relative to the total volume of the sound absorbing material layer 3 and the first air layer 4. In order to improve the sound absorbing and shielding performance, it is important to effectively utilize the sound absorbing material layer 3. The presence of the content products 5 allows the sound incident thereon to be reflected to cause the sound to be scattered in the sound absorbing material layer 3 and the first air layer 4, with the scattering of the sound allowing the sound to be transmitted through the sound absorbing material at an increased rate with a resultant increase in the number of times in which the sound is directed to the sound absorbing material. Thus, the sound absorbing and shielding performance is highly improved. With an occupation rate of the content products 5 in a range below 10%, scattering of the sound does not effectively occur. With the occupation ratio or the volume ratio of the content parts 5 in the range beyond 90%, the cubatures, which are occupied with the sound absorbing material layer 3 and the first air layer 4, are inevitably decreased, resulting in the degraded sound absorbing and shielding performance. When taking the performance into the serious consideration, the volume ratio of the content products 5 is preferably determined in the range from 50 to 90%.

With the volume ratio in the range from 50 to 90%, the sound is effectively caused to scatter in the first air layer 4.

In the above event, the presence of the ventilating property of the content products 5 offers no specific problem, and the content products 5 need to be located in the first air layer 4. Also, the content products 5 may be directly located onto the second panel layer 6 or onto the first panel layer 2. Further, when desired to particularly improve the sound absorbing and shielding performance, it is advisable to locate an additional sound absorbing material layer or a dead air layer between the second panel layer 6 and the content products 5. In addition, it is also advisable to form the sound absorbing material layer and the dead air layer between plural content parts 5.

Figure 21:
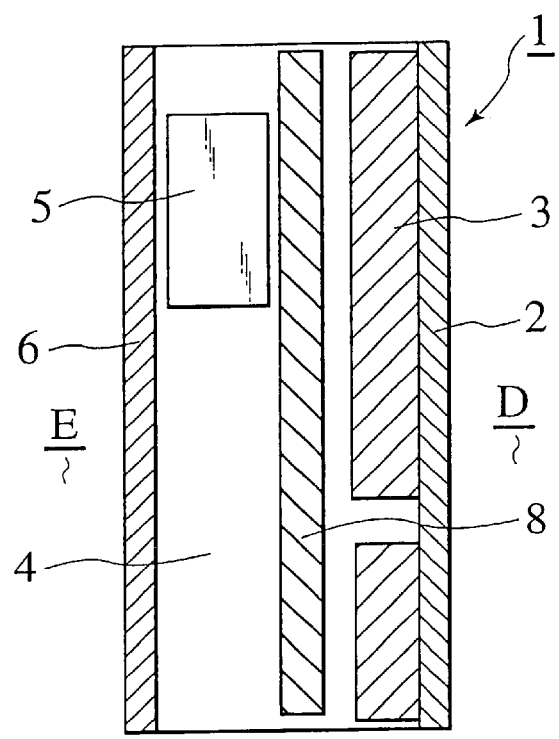
FIG. 21 is an enlarged cross sectional view of a twelfth preferred embodiment of a sound absorbing and shielding structure of a five-layered configuration employing a third panel layer in addition to the sound absorbing and shielding structure shown in FIG. 19.

As shown in FIG. 21, the sound absorbing and shielding structure may be modified such that it is constructed having five layers composed of the first panel layer 2, the sound absorbing material layer 3, a third panel layer 8, the first air layer 4 and the second panel layer 6 which are located in a sequence from the source D of sound. The third panel layer 8, which has plural through-bores (not shown), allows the sound remaining between the first and second panel layers 2 and 6 to be effectively scattered for increasing the rate of the sound to be transmitted through the sound absorbing material layer 3 and the first panel layer 2 having the ventilating property while increasing the number of times in which the sound is attenuated.

In the modified form of FIG. 21, the third panel layer 8 with the through-bores is mounted in a space between the first and second panel layers 2 and 6 to face the sound absorbing material layer 3 and the content parts 5. The opening ratio of the through-bores of the third panel layer 8 is selected to be in a value ranging from 1 to 50% relative to the whole surface area of the third panel layer 8. The third panel layer 8 is also selected to have a surface density ranging from 0.5 to 10 kg/m$^2$. In order to effectively utilize the third panel layer 8 with the through-bores, it is important for the third panel layer 8 to face the sound absorbing material layer and the dear air layer to increase the rate of scattering of the sound. With the third panel layer 8 having the surface density of the value below 0.5 kg/m$^2$, the third panel layer 8 has an inadequate rigidity to resist the sound pressure with a resultant difficulty in obtaining an increased expanding performance. In contrast, with the third panel layer having the surface density of the value 10 kg/m$^2$, the mass of the sound absorbing and shielding structure becomes too big which is contrary to the weight lightening of the final product. When desired to have a compatibility of the sound absorbing and shielding performance and the weight-lightening property of the final product, the third panel layer 8 is preferably selected to have the surface density of from 1 to 5 kg/m$^2$.

In addition, it is desired that a space between the first and second panel layers 2 and 6 is determined to have a sound absorbing characteristic having a ¼ wavelength of a predefined frequency in a range from 80 to 120%, with the thickness of the first panel layer 2 being selected to have a value below that of the ⅛ wavelength of a specific frequency. Note should be undertaken here that the most pertinent target point wherein the sound has a high particle velocity at a stomach portion of the wavelength and wherein the effective sound absorbing performance can be obtained is located at a position spaced from the rigid end formed by the second panel layer 2 by the ¼ wavelength of respective frequencies, with the thickness of the first panel layer 2 being thus determined to have the value below the ⅛ wavelength. This corresponds to a point dislocated from the position of the maximum particle velocity by a value of 80%. Accordingly, it is highly effective to locate the first panel layer 2, which has the thickness of the value below the ⅛ wavelength of the aforementioned specific frequency, at the point of the maximum particle velocity. Thus, it becomes important to consider the layout of the area to be employed while designing the thickness of the first panel layer 2 so as to be close to the aforementioned thickness.

The sound absorbing and shielding structure having such a feature can be effectively employed in a vehicle such as an automotive vehicle wherein various restriction such as the mounting space, the weight and the production costs etc. are most exacting.

Figure 22:
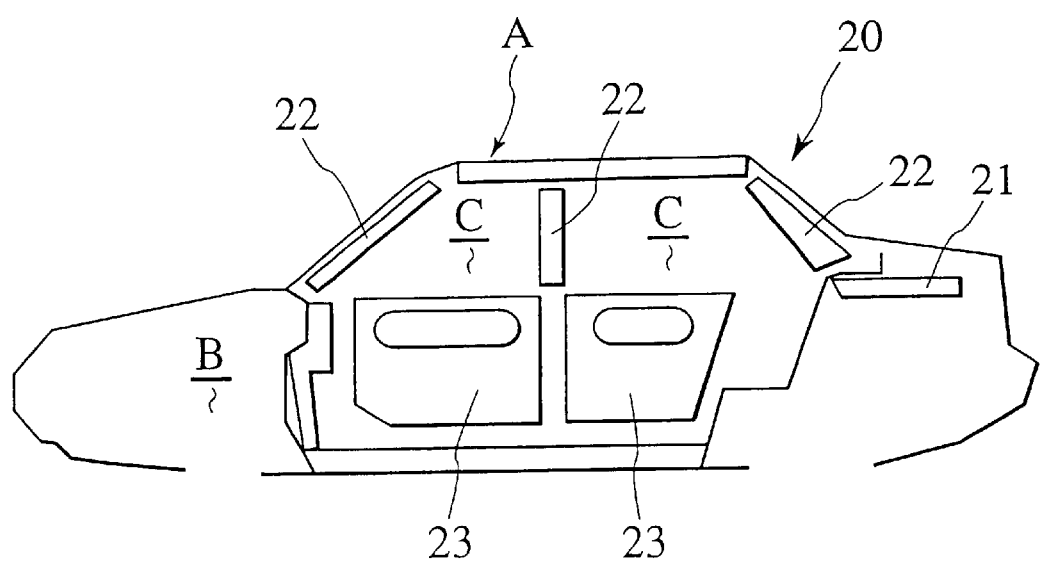
FIG. 22 is a schematic view illustrating a vehicular body applied with the sound absorbing and shielding structure according to the present invention.

For example, FIG. 22 shows an example of the sound absorbing and shielding structure of the present invention is applied to an automotive vehicle. In FIG. 22, the automotive vehicle 20 includes a vehicle body A having a vehicular body panel constructed of the second panel layer 6 discussed above, and a rear parcel trim section 21 incorporating the first panel layer 2 of the sound absorbing and shielding structure in a position adjacent a passenger compartment C. With such a structure, it is highly effective to prevent various noises such as a sound produced by an exhaust pipe, load noises produced by rear drive wheels and a liquid sound produced in a fuel tank from entering the passenger compartment C.

In such an automotive vehicle, the sound absorbing material layer 3 can be located in a front portion of the rear parcel trim section 21 or in a limited part thereof such that the sound absorbing material layer 3 is economically arranged within a limited area to allow a specific sound, which is produced at a specific area, to be effectively attenuated.

As noted above, the second panel layer 6 of the sound absorbing and shielding structure of the present invention is incorporated in the vehicular body panel while constituting pillar trim sections 22 having the first panel layer located at the side of the passenger compartment C. It is thus possible for the passenger compartment C to avoid entry of various noises such as an engine noise, a load noise, a wind cutting noise or noises produced by other sources of sound except the automotive vehicle. In this event, the sound absorbing material layer 3 can be located in a front face of each pillar trim section 22 or in a limited part thereof such that the sound absorbing material layer 3 is economically arranged within a limited area to allow a specific sound, which is produced at a specific area, to be effectively attenuated.

In addition, the vehicle body A includes the body panel composed of the second panel layer 6 of the sound absorbing and shielding structure of the present invention, and door trim sections 23 each of which has the first panel layer 2 located at the side of the passenger compartment C to effectively avoid the entry of the various sounds or noises such as the engine sound, the load noises, the wind cutting noises or other noises from the other sources of sound except the automotive vehicle. In this instance, the presence of the third panel layer 8 with the through-bores utilized as a plastic plate or a metallic plate of interior parts of the door trim sections allows the sound absorbing and shielding structure and the door sections to have a compatibility of rigidity as well as improved functions. Further, the sound absorbing material layer 3 can be located in a front face of each door trim section 23 or in a limited part thereof such that the sound absorbing material layer 3 is economically arranged within a limited area of each door trim section to allow a specific sound, which is produced at a specific area, to be effectively attenuated. Also, forming a ventilating region in the first panel layer 2 of each door trim section 23 at a position close to the ears of the vehicle occupant provides an improved sound absorbing and shielding structure which is superior in economical efficiency and weight-lightening effect.

The sound absorbing and shielding structure of the present invention will now be described with reference to the following Examples:

EXAMPLE 1

A sample of the sound absorbing and shielding structure 1 of the four-layered assembly was fabricated by using the sound absorbing material layer 3 made of a single layer formed of a polyester fibrous member having the coefficient of bending elasticity of 1000 kPa and the surface density of 1 kg/m$^2$. Further, the maximum thickness T1 of the first air layer 4 was selected to be 60% of the total thickness T0 of the sound absorbing and shielding structure 1. The apparent volume ratio of the content products 5 was selected to be 80% of the volume of the first air layer 4, and the second panel layer 6 was selected to have the surface density of 4 kg/m$^2$ and the opening rate of the through-bores 6a in the range of 20% relative to the surface area of the second panel layer 6, with the surface ratio (i.e., the surface area of the second panel layer 6: the surface area of the sound absorbing material layer 3) being selected to be 1:1. In this manner, the sound absorbing and shielding structure 1 shown in FIG. 6 was obtained.

EXAMPLE 2

Another sample of the sound absorbing and shielding structure 1 was manufactured in the same manner as in EXAMPLE 1 except for the first dead air layer 4, which was selected to have the maximum thickness T1 of 10% of the total thickness T0 of the sound absorbing and shielding structure 1.

EXAMPLE 3

Another sample of the sound absorbing and shielding structure 1 was manufactured in the same manner as in EXAMPLE 1 except for the first air layer 4, which has the maximum thickness T1 selected to be 95% of the maximum thickness T0 of the sound absorbing and shielding structure 1.

EXAMPLE 4

Another sample of the sound absorbing and shielding structure 1 was manufactured in the same manner as in EXAMPLE 1 except for the content parts 5 whose apparent volume ratio is selected to be 10% of the total volume of the first dead air layer 4.

EXAMPLE 5

Another sample of the sound absorbing and shielding structure 1 was manufactured in the same manner as in EXAMPLE 1 except for the content products 5 whose apparent volume ratio was selected to be 90% of the total volume of the first air layer 4.

EXAMPLE 6

Another sample of the sound absorbing and shielding structure 1 was manufactured in the same manner as in EXAMPLE 1 except for the second panel layer 6 whose total surface density was selected to be 0.5 kg/m$^2$.

EXAMPLE 7

Another sample of the sound absorbing and shielding structure 1 was manufactured in the same manner as in EXAMPLE 1 except for the second panel layer 6 whose total surface density was selected to be 10 kg/m$^2$.

EXAMPLE 8

Another sample of the sound absorbing and shielding structure 1 was manufactured in the same manner as in EXAMPLE 1 except for the second panel layer 6 with the through-bores 6a having the opening rate of 0.01%.

EXAMPLE 9

Another sample of the sound absorbing and shielding structure 1 was manufactured in the same manner as in EXAMPLE 1 except for the second panel layer 6 with the through-bores 6a having the opening rate of 50%.

EXAMPLE 10

Another sample of the sound absorbing and shielding structure 1 was manufactured in the same manner as in EXAMPLE 1 with the exception that the surface ratio (i.e., the surface area of the second panel layer 6: the surface area of the sound absorbing material layer 3) was selected to be 1:5.

EXAMPLE 11

Another sample of the sound absorbing and shielding structure 1 was manufactured in the same manner as in EXAMPLE 1 with the exception that the surface ratio (i.e., the surface area of the second panel layer 6: the surface area of the sound absorbing material layer 3) was selected to be 5:1.

EXAMPLE 12

Another sample of the sound absorbing and shielding structure 1 was manufactured in the same manner as in EXAMPLE 1 except for the sound absorbing material layer 3 having the coefficient of bending elasticity of 100 kPa and the total surface density of 0.5 kg/m$^2$.

EXAMPLE 13

Another sample of the sound absorbing and shielding structure 1 was manufactured in the same manner as in EXAMPLE 1 except for the sound absorbing material layer 3 having the coefficient of bending elasticity of 2000 kPa and the total surface density of 2 kg/m².

EXAMPLE 14

Another sample of the sound absorbing and shielding structure 1 was manufactured in the same manner as in EXAMPLE 1 except for the sound absorbing material layer 3 formed of a felt.

EXAMPLE 15

Another sample of the sound absorbing and shielding structure 1 was manufactured in the same manner as in EXAMPLE 1 except for the sound absorbing material layer 3 formed of urethane.

EXAMPLE 16

Another sample of the sound absorbing and shielding structure 1 was manufactured in the same manner as in EXAMPLE 1 except for the sound absorbing material layer 3 formed of two layers, as shown in FIG. 8, one of which was made of a high density layer formed of fibers, with the coefficient of bending elasticity being selected to have a value of 300 Mpa with the total surface density of 3 kg/m².

EXAMPLE 17

Another sample of the sound absorbing and shielding structure 1 was manufactured in the same manner as in EXAMPLE 1 except for the sound absorbing material layer 3 formed of two layers, as shown in FIG. 10, one of which was made of a high density layer formed of plastic, with the opening rate of 1% and the total surface density of the absorbing material layer 3 being selected to be 5 kg/m².

EXAMPLE 18

Another sample of the sound absorbing and shielding structure 1 was manufactured in the same manner as in EXAMPLE 1 except for the sound absorbing material layer 3 formed of two layers, one of which was made of a high density layer formed of plastic, with the opening rate of 80% and the total surface density of the absorbing material layer 3 being selected to be 5 kg/m².

EXAMPLE 19

Another sample of the sound absorbing and shielding structure 1 was manufactured in the same manner as in EXAMPLE 1 except for the sound absorbing material layer 3 formed of two layers, one of which was made of a high density layer formed of plastic, with the opening rate of 40% and the total surface density of the absorbing material layer 3 being selected to be 5 kg/m².

EXAMPLE 20

Another sample of the sound absorbing and shielding structure 1 was manufactured in the same manner as in EXAMPLE 1 with the exception that the fiber layers 12 were adhered to the content products 5 in the first air layer 4 as viewed in FIG. 14.

EXAMPLE 21

Another sample of the sound absorbing and shielding structure 1 was manufactured in the same manner as in EXAMPLE 1 with the exception that the fiber layer 12 was adhered to the second panel layer 6 as viewed in FIG. 12.

EXAMPLE 22

Another sample of the sound absorbing and shielding structure 1 was manufactured in the same manner as in EXAMPLE 1 with the exception that the fiber layers 12 were adhered to the content parts 5 in the first dead air layer 4 and to the second panel layer 6.

EXAMPLE 23

Another sample of the sound absorbing and shielding structure 1 was manufactured in the same manner as in EXAMPLE 1 except for the sound absorbing material layer 3 having the coefficient of bending elasticity of 50 kPa and the surface density of 0.5 kg/m², but the sound absorbing material layer 3 was not maintained in shape.

EXAMPLE 24

Another sample of the sound absorbing and shielding structure 1 was manufactured in the same manner as in EXAMPLE 1 except for the sound absorbing material layer 3 having the coefficient of bending elasticity of 3000 kPa and the total surface density of 3 kg/m², but the bores could not be formed in the sound absorbing material layer 3.

EXAMPLE 25

Another sample of the sound absorbing and shielding structure 1 was manufactured in the same manner as in EXAMPLE 1 except for the sound absorbing material layer 3 formed of two layers, as shown in FIG. 10, one of which was made of a high density layer formed of plastic, with the opening rate of 90% and the total surface density of the absorbing material layer 3 being selected to be 5 kg/m².

EXAMPLE 26

A further example of the sound absorbing and shielding structure 1 of the six-layered assembly shown in FIG. 7 was fabricated by using the second air layer 7 having the maximum thickness T2 selected to be 30% of the total thickness T0 of the sound absorbing and shielding structure 1, with the apparent volume ratio of the content products 9 in the second air layer 7 being selected to be 80% of that of the second air layer 7. The sound absorbing material layer 3 was made of a single layer formed of a polyester fibrous member having the coefficient of bending elasticity of 1000 kPa and the total surface density of 1 kg/m². In addition, the maximum thickness T1 of the first air layer 4 was selected to be 60% of the maximum thickness T0 of the sound absorbing and shielding structure 1. The apparent volume ratio of the content products 5 was selected to be 80% of that of the first air layer 4, and the second panel layer 6 was selected to have the surface density of 4 kg/m² and the opening rate of the through-bores 6a in the range of 20% relative to the surface area of the second panel layer 6, with the surface ratio (i.e., the surface area of the second panel layer 6: the surface area of the sound absorbing material layer 3) being selected to be 1:1.

EXAMPLE 27

A further sample of the sound absorbing and shielding structure 1 was manufactured in the same manner as in EXAMPLE 26 except for the second air layer 7 having the maximum thickness T2 of 10% of the total thickness T0 of the sound absorbing and shielding structure 1, and the first air layer 4 having the maximum thickness T1 of 80% of the total thickness T0 of the sound absorbing and shielding structure 1.

EXAMPLE 28

A further sample of the sound absorbing and shielding structure 1 was manufactured in the same manner as in EXAMPLE 26 except for the second air layer 7 having the maximum thickness T2 of 60% of the total thickness T0 of the sound absorbing and shielding structure 1, and the first air layer 4 having the maximum thickness T1 of 30% of the total thickness T0 of the sound absorbing and shielding structure 1.

EXAMPLE 29

A further sample of the sound absorbing and shielding structure 1 was manufactured in the same manner as in EXAMPLE 26 except for the content products 9 whose apparent volume ratio is selected to be 10% of the total volume of the second air layer 7.

EXAMPLE 30

A further sample of the sound absorbing and shielding structure 1 was manufactured in the same manner as in EXAMPLE 26 except for the content parts 9 whose apparent volume ratio is selected to be 90% of the total volume of the second air layer 7.

EXAMPLE 31

A further sample of the sound absorbing and shielding structure 1 was manufactured in the same manner as in EXAMPLE 26 with the exception that the apparent volume ratio of the content products 5 in the first air layer 4 was selected to be 10% of the total volume of the first dead air layer 4.

EXAMPLE 32

A further sample of the sound absorbing and shielding structure 1 was manufactured in the same manner as in EXAMPLE 26 with the exception that the apparent volume ratio of the content parts 5 in first air layer 4 was selected to be 90% of the total volume of the first air layer 4.

EXAMPLE 33

A further sample of the sound absorbing and shielding structure 1 was manufactured in the same manner as in EXAMPLE 26 except for the second panel layer 6 whose surface density was selected to be 0.5 kg/m$^2$.

EXAMPLE 34

A further sample of the sound absorbing and shielding structure 1 was manufactured in the same manner as in EXAMPLE 26 except for the second panel layer 6 whose surface density was selected to be 10 kg/m$^2$.

EXAMPLE 35

A further sample of the sound absorbing and shielding structure 1 was manufactured in the same manner as in EXAMPLE 26 except for the second panel layer 6 with the through-bores 6*a* having the opening rate of 0.01%.

EXAMPLE 36

A further sample of the sound absorbing and shielding structure 1 was manufactured in the same manner as in EXAMPLE 26 except for the second panel layer 6 with the through-bores 6*a* having the opening rate of 50%.

EXAMPLE 37

A further sample of the sound absorbing and shielding structure 1 was manufactured in the same manner as in EXAMPLE 26 with the exception that the surface ratio (i.e., the surface area of the second panel layer 6: the surface area of the sound absorbing material layer 3) was selected to be 1:5.

EXAMPLE 38

A further sample of the sound absorbing and shielding structure 1 was manufactured in the same manner as in EXAMPLE 26 with the exception that the surface ratio (i.e., the surface area of the second panel layer 6: the surface area of the sound absorbing material layer 3) was selected to be 5:1.

EXAMPLE 39

A further sample of the sound absorbing and shielding structure 1 was manufactured in the same manner as in EXAMPLE 26 except for the sound absorbing material layer 3 having the coefficient of bending elasticity of 100 kPa and the total surface density of 0.5 kg/m$^2$.

EXAMPLE 40

A further sample of the sound absorbing and shielding structure 1 was manufactured in the same manner as in EXAMPLE 26 except for the sound absorbing material layer 3 having the coefficient of bending elasticity of 2000 kPa and the total surface density of 2 kg/m$^2$.

EXAMPLE 41

A further sample of the sound absorbing and shielding structure 1 was manufactured in the same manner as in EXAMPLE 26 except for the sound absorbing material layer 3 formed of a felt.

EXAMPLE 42

A further sample of the sound absorbing and shielding structure 1 was manufactured in the same manner as in EXAMPLE 26 except for the sound absorbing material layer 3 formed of urethane.

EXAMPLE 43

A further sample of the sound absorbing and shielding structure 1 was manufactured in the same manner as in EXAMPLE 26 except for the sound absorbing material layer 3 formed of two layers, as shown in FIG. 9, one of which was made of a high density layer formed of fibers having the coefficient of bending elasticity of 300 Mpa with the surface density of 3 kg/m$^2$.

EXAMPLE 44

A further sample of the sound absorbing and shielding structure 1 was manufactured in the same manner as in EXAMPLE 26 except for the sound absorbing material layer 3 formed of two layers, as shown in FIG. 11, one of which was made of a high density layer formed of plastic having the opening rate of 1%, with the total surface density of the sound absorbing material layer 3 being selected to be 5 kg/m$^2$.

EXAMPLE 45

A further sample of the sound absorbing and shielding structure 1 was manufactured in the same manner as in EXAMPLE 26 except for the sound absorbing material layer 3 formed of two layers, one of which was made of a high density layer formed of plastic having the opening rate of 80%, with the total surface density of the absorbing material layer 3 being selected to be 5 kg/m$^2$.

EXAMPLE 46

A further sample of the sound absorbing and shielding structure 1 was manufactured in the same manner as in EXAMPLE 26 except for the sound absorbing material layer 3 formed of two layers, one of which was made of a high density layer formed of plastic having the opening rate of 40%, with the total surface density of the absorbing material layer 3 being selected to be 5 kg/m$^2$.

EXAMPLE 47

A further sample of the sound absorbing and shielding structure 1 was manufactured in the same manner as in EXAMPLE 26 with the exception that the fiber layers 12 were adhered to the content products 5 in the first air layer 4 as viewed in FIG. 15.

EXAMPLE 48

A further sample of the sound absorbing and shielding structure 1 was manufactured in the same manner as in EXAMPLE 26 with the exception that the fiber layer 12 was adhered to the second panel layer 6 as viewed in FIG. 13.

EXAMPLE 49

A further sample of the sound absorbing and shielding structure 1 was manufactured in the same manner as in EXAMPLE 26 with the exception that the fiber layers 12 were adhered to the content products 5 in the first air layer 4 and to the second panel layer 6.

EXAMPLE 50

A further sample of the sound absorbing and shielding structure 1 was manufactured in the same manner as in EXAMPLE 26 except for the sound absorbing material layer 3 having the coefficient of bending elasticity of 50 kPa and the total surface density of 0.5 kg/m$^2$, but the sound absorbing material layer 3 was not maintained in shape.

EXAMPLE 51

A further sample of the sound absorbing and shielding structure 1 was manufactured in the same manner as in EXAMPLE 26 except for the sound absorbing material layer 3 having the coefficient of bending elasticity of 3000 kPa and the total surface density of 3 kg/m$^2$, but the sound absorbing material layer 3 could not be formed into a desired shape and the bores could not be formed in the sound absorbing material layer 3.

EXAMPLE 52

A further sample of the sound absorbing and shielding structure 1 was manufactured in the same manner as in EXAMPLE 26 except for the sound absorbing material layer 3 formed of two layers, as shown in FIG. 11, one of which was made of a high density layer formed of plastic having the opening rate of 90%, with the total surface density of the sound absorbing material layer 3 being selected to have a value of 5 kg/m$^2$.

Comparison 1

A still further sample of the sound absorbing and shielding structure 50 of the four-layered type shown in FIG. 1 was manufactured to have the same structure as that of EXAMPLE 1 except for the sound absorbing material layer 3 which is made of two layers wherein the high density layer is formed of a plastic cover material 51 having the opening rate of 0%, and which has the total surface density of 5 kg/m$^2$.

Comparison 2

A still further sample of the sound absorbing and shielding structure 50 of the four-layered type shown in FIG. 1 was manufactured to have the same structure as that of EXAMPLE 1 except for the sound absorbing material layer 3 which is made of two layers composed of the felt and the plastic cover material (i.e., the high density layer) 51 having the opening rate of 0%, and which has the total surface density of 5 kg/m$^2$.

Comparison 3

A still further sample of the sound absorbing and shielding structure 50 of the four-layered type shown in FIG. 1 was manufactured to have the same structure as that of EXAMPLE 1 except for the sound absorbing material layer 3 which is made of two layers composed of the urethane and the plastic cover material (i.e., the high density layer) 51 having the opening rate of 0%, and which has the total surface density of 5 kg/m$^2$.

Comparison 4

A still further sample of the sound absorbing and shielding structure 50 of the six-layered type, wherein the second air layer 7 and the third panel layer 8 are newly added to the structure shown in FIG. 1, was manufactured to have the same structure as that of EXAMPLE 26 with the exception that the second air layer 7 has the maximum thickness T2 of 90% of the maximum thickness T0 of the structure 50 wherein the sound absorbing material layer 3 has the additional plastic cover material 51 having the opening rate of 0% and the surface density of 5 kg/m$^2$.

Comparison 5

A still further sample of the sound absorbing and shielding structure 50 was manufactured to have the same structure as that of EXAMPLE 26 with the exception that the sound absorbing material layer 3 is constructed of two layers composed of the felt and the plastic cover material 51 having the opening rate of 0%, and has the total surface density of 5 kg/m$^2$.

Comparison 6

A still further sample of the sound absorbing and shielding structure 50 was manufactured to have the same structure as that of EXAMPLE 26 with the exception that the sound absorbing material layer 3 is constructed of two layers composed of the urethane and the plastic cover material 51 having the opening rate of 0%, and has the total surface density of 5 kg/m$^2$.

Appraisal Test Result

The above sound absorbing and shielding structures manufactured based on the above EXAMPLES and the above COMPARISONS have been appraised to analyze the shape retaining property, the piercing property and the number of fabrication steps for the sound absorbing material layer 3. In the appraisal test of the structures, the sound absorbing and shielding structure (i.e., the related art structure), which were manufactured based on the COMPARISON 1, was used as a reference unit, with a symbol A designating the same result as obtained by the reference unit of COMPARISON 1, a symbol ○ designating a better result than that obtained by the reference unit of COMPARISON 1, a symbol ◎ designating a remarkably improved result over the reference unit of COMPARISON 1 and a symbol × designating a degraded result lower than that obtained by the reference unit of COMPARISON 1.

Further, the sound shielding performance of the sound absorbing and shielding structures has been carried out by measuring an acoustic transmission loss with the use of a reverberation chamber provided under JIS A1416. That is, a symbol ⊙ designates the highest shielding result wherein the acoustic transmission loss has been improved by a value beyond 3 dB at a frequency of 1 kHz; a symbol ○ designates a better shielding effect wherein the acoustic transmission loss has been improved in a range between 1 dB and 3 dB; a symbol A designates a slightly improved shielding effect wherein the acoustic transmission loss has been improved by a value within 1 dB; and a symbol × designates a degraded performance.

These appraised results are shown in FIGS. 23 to 25. FIG. 23 illustrates a table 100 that shows respective appraised results of EXAMPLES 1 to 25 and COMPARISONS 1 to 3 together with respective specifications of the sound absorbing and shielding structures of the four-layered type. Likewise, FIG. 24 illustrates a table 102 that shows respective appraised results of EXAMPLES 26 to 52 and COMPARISONS 4 to 6 together with respective specifications of the sound absorbing and shielding structures of the six-layered type. FIG. 25 illustrates a table 104 that represents the appraised results of the table 102 of FIG. 24 in terms of EXAMPLES 26 to 52 in comparison with COMPARISONS 4 to 6.

Figure 26:
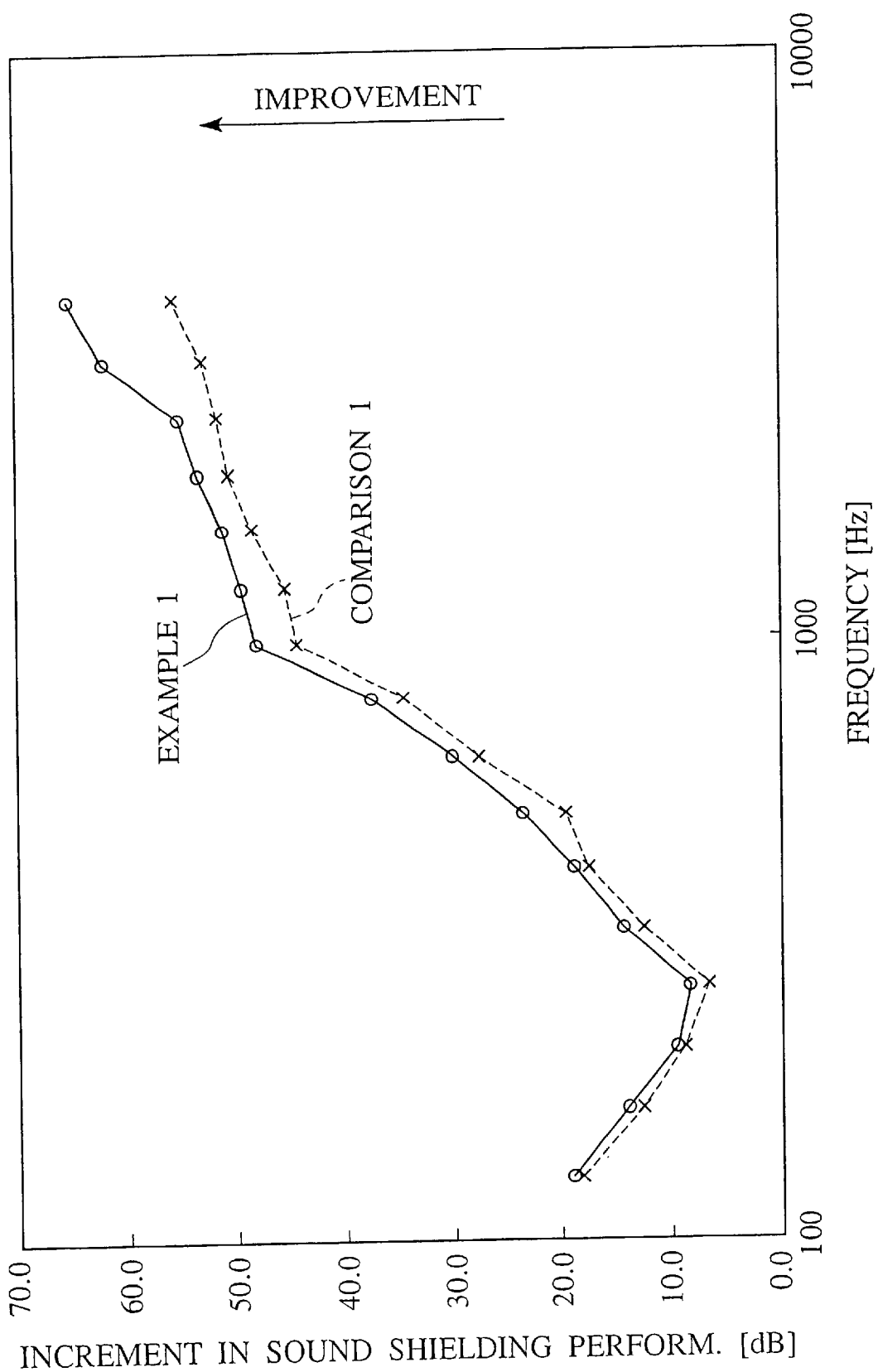
FIG. 26 is a graph showing the variation in the sound shielding performances (sound transmission losses) of the sound absorbing and shielding structure of the first preferred embodiment of the present invention versus that obtained in COMPARISON 1, plotted in terms of a frequency.

FIG. 26 shows a graph wherein the acoustic transmission loss is plotted in terms of the frequency for the sound absorbing and shielding structures (of the four-layered type) related to EXAMPLE 1 and COMPARISON 1.

Figure 27:
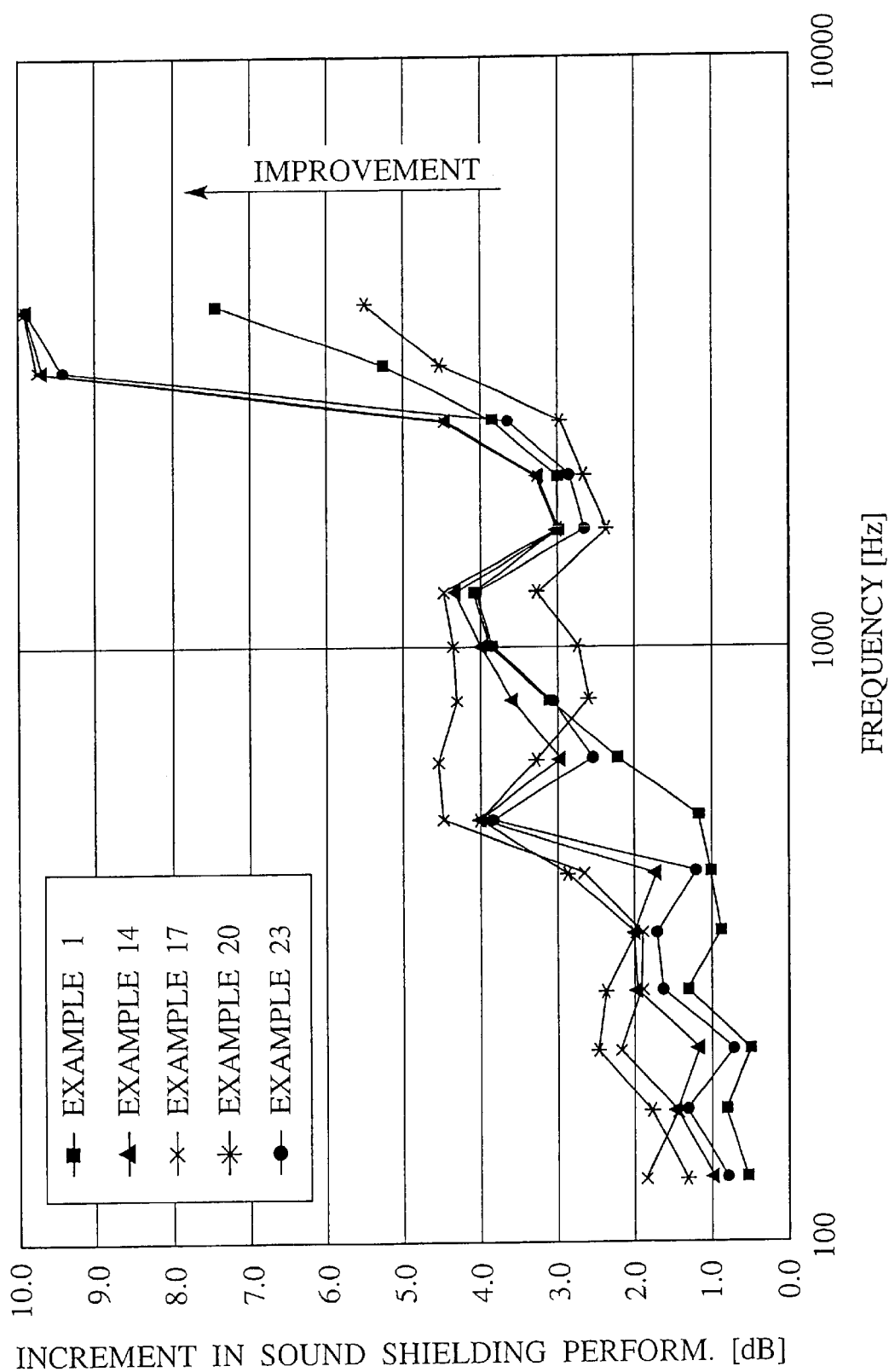
FIG. 27 is a graph showing the sound shielding performances (sound transmission losses), as a difference over that of the COMPARISON 1, of typical examples of the sound absorbing and shielding structures of the four-layered configuration according to the present invention plotted in terms of a whole frequency range.

FIG. 27 shows a graph for illustrating incremental values of the acoustic transmission losses of respective typical samples of the sound absorbing and shielding structures of the four-layered type, that is, the product of the acoustic transmission loss of each of the sound absorbing and shielding structures of the four-layered type related to typical EXAMPLES minus the acoustic transmission loss of the typical COMPARISON 1, with the incremental values being plotted in terms of the frequency for each of the above typical EXAMPLES.

Figure 28:
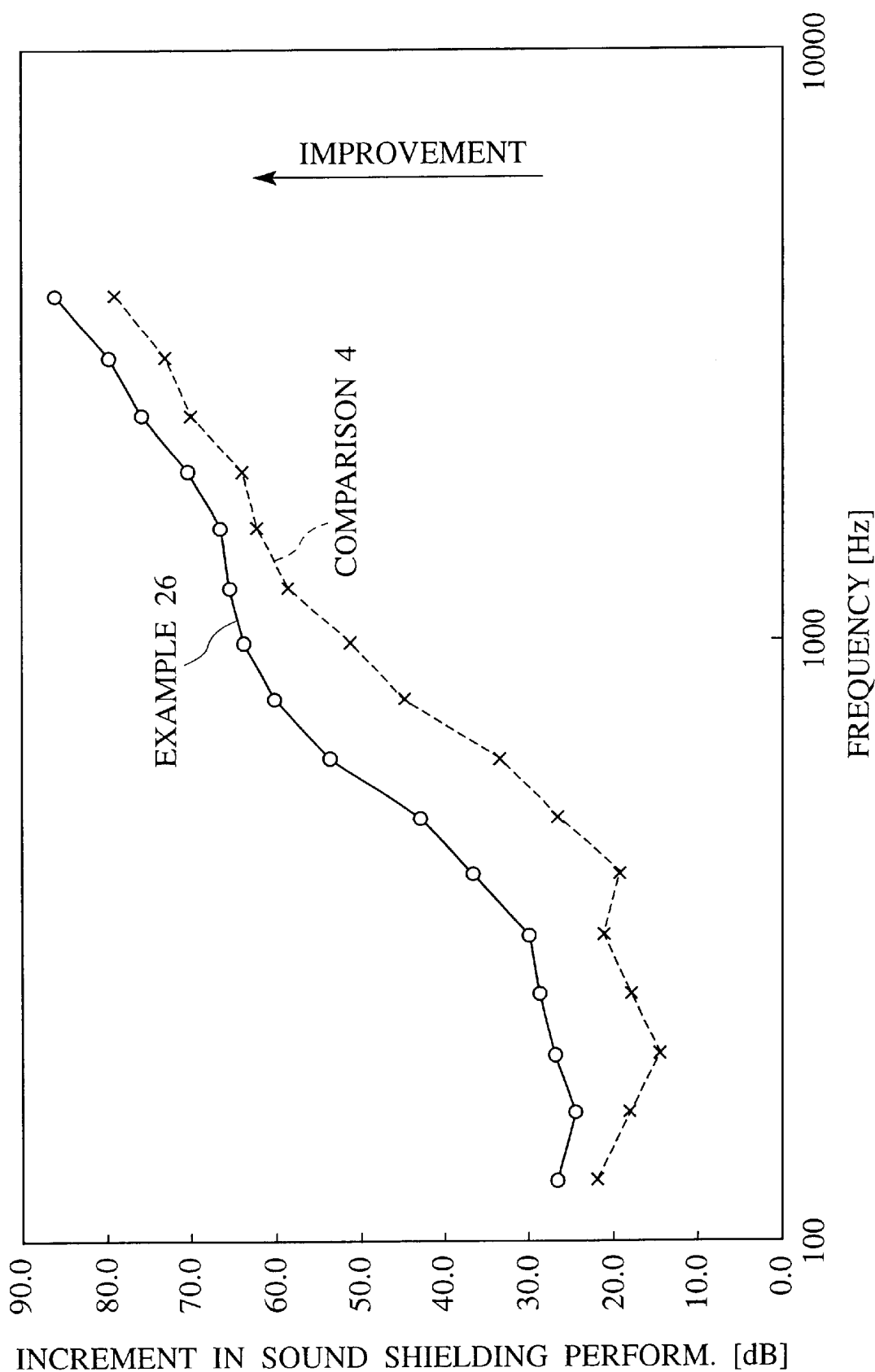
FIG. 28 is a graph showing the sound shielding performance (sound transmission losses) of the sound absorbing and shielding structure of the six-layered configuration obtained in EXAMPLE 26 versus that obtained in COMPARISON 4, plotted in terms of a frequency.

FIG. 28 shows a graph wherein the acoustic transmission loss is plotted in terms of the frequency for the sound absorbing and shielding structures (of the six-layered type) related to EXAMPLE 26 and COMPARISON 4.

FIG. 29 shows a graph for illustrating incremental values of the acoustic transmission losses of respective typical samples of the sound absorbing and shielding structures of the six-layered type, that is, the product of the acoustic transmission loss of each of the sound absorbing and shielding structures of the six-layered type related to the typical EXAMPLES minus the acoustic transmission loss of the typical COMPARISON 4, with the incremental values being plotted in terms of the frequency for each of the above typical EXAMPLES.

In view of the above results, it is confirmed that the sound absorbing structure of the present invention has a superior acoustic transmission loss over the related art structure. Despite the degraded shape retaining property and the degraded piercing property of the sound absorbing material layer 3 in each of the sound absorbing and shielding structures of the above EXAMPLES 23 to 25 and 50 to 52, the sound absorbing and shielding structures have an improved sound shielding performance. Thus, these sound absorbing and shielding structures may suitably be applied to a specific area that does not need the shape retaining property and a specific wall that does not need through-bores.

EXAMPLE 53

A sample of the sound absorbing and shielding structure 1, which includes the first panel layer 2, the second panel layer 6 and an intermediate layer located between the first and second panel layers 2 and 6 and composed of the sound absorbing material layer 3 and the air layer 4 as viewed in FIG. 19, was manufactured under conditions that the second panel layer 6 was made of steel plate with the thickness 0.5 mm; that the air layer 4 layer accommodates therein a single content product 5 with the volume ratio of 25% relative to the total volume of the intermediate layer, i.e., the total volume of the air layer 4 and the sound absorbing material layer 3; and that the sound absorbing material layer 3 was made of the felt with the thickness 30 mm having the surface density of 1.0 kg/m$^2$, with its predefined total surface area being selected to be 5% relative to that of the first panel layer 2. Further, the first panel layer 2 was constructed of the main component of the polyester fibrous body which had the opening rates of the through-bores in the value of 10% relative to the whole surface area of the first panel layer 2 and which had the ventilating region of 50% relative to the whole surface area of the first panel layer 2, except for the through-bores, with the thickness of 5 mm, the surface density of 1 kg/m$^2$ and the coefficient rate of bending elasticity of 1000 kPa. The amount of ventilating air was adjusted to be 5 cm$^3$/(cm$^2$·sec) and the first and second panel layers 2 and 5 were spaced from one another by 150 mm.

The sound absorbing and shielding structure discussed above is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value ¹⁄₁₃₆ the wavelength of the predefined frequency.

EXAMPLE 54

Another sample of the sound absorbing and shielding structure 1 was prepared to have the same structure as that of EXAMPLE 53 except for the sound absorbing material layer 3 with the predefined surface area of 90% relative to that of the first panel layer 2. This sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value ¹⁄₁₃₆ the wavelength of the predefined frequency.

EXAMPLE 55

Another sample of the sound absorbing and shielding structure 1 was prepared to have the same structure as that of EXAMPLE 53 with the exception that the air layer 4 had the predefined maximum thickness of 3% relative to that of the sound absorbing and shielding structure 1; that the air layer 4 had accommodated the single content products 5 whose volume ratio was selected to be 70% relative to the total volume of the sound absorbing material layer 3 and the air layer 4; and that the space of between the first and second panel layers 2 and 6 was selected to be 100 mm.

Also, the sound absorbing and shielding structure 1 was preset to the frequency of 850 Hz, with the space of 100 mm between the first and second panel layers 2 and 6 corresponding to the value of ¼ wavelength of the predefined frequency. The thickness of the first panel layer 2 was selected to a value of 1/80 of the wavelength of the predefined frequency.

EXAMPLE 56

Another sample of the sound absorbing and shielding structure 1 was prepared to have the same structure as that of EXAMPLE 53 with the exception that the air layer 4 had the predefined maximum thickness of 70% relative to that of the sound absorbing and shielding structure 1; that the air layer 4 had accommodated the single content product 5 whose volume ratio was selected to be 30% relative to the total volume of the sound absorbing material layer 3 and the air layer 4; and that the space between the first and second panel layers 2 and 6 was selected to be 100 mm. Also, the sound absorbing and shielding structure 1 was preset to the frequency of 850 Hz, with the space of 100 mm between the first and second panel layers 2 and 6 corresponding to the value of ¼ wavelength of the predefined frequency. The thickness of the first panel layer 2 was selected to a value of 1/80 of the wavelength of the predefined frequency.

EXAMPLE 57

Another sample of the sound absorbing and shielding structure 1 was prepared to have the same structure as that of EXAMPLE 53 with the exception that the air layer 4 had accommodated the single content product 5 whose volume ratio was selected to be 10% relative to the total volume of the intermediate layer (i.e., between the sound absorbing material layer 3 and the air layer 4); and that the space between the first and second panel layers 2 and 6 was selected to be 250 mm. Also, this sound absorbing and shielding structure 1 was preset to the frequency of 300 Hz, with the space of 250 mm between the first and second panel layers 2 and 6 corresponding to the value of 113% of ¼ wavelength of the predefined frequency. The thickness of the first panel layer 2 was selected to a value of 1/2200 of the wavelength of the predefined frequency.

EXAMPLE 58

Another sample of the sound absorbing and shielding structure 1 was prepared to have the same structure as that of EXAMPLE 53 with the exception that four content products 5 were mounted in the air layer 4 with the volume ratio of the contents 5 being selected to be 90% relative to the total volume of the intermediate layer (i.e., between the sound absorbing material layer 3 and the air layer 4); and that the space between the first and second panel layers 2 and 6 was selected to be 250 mm. Also, this sound absorbing and shielding structure 1 was preset to the frequency of 300 Hz, with the space of 250 mm between the first and second panel layers 2 and 6 corresponding to the value of 113% of ¼ wavelength of the predefined frequency. The thickness of the first panel layer 2 was selected to a value of 1/2200 of the wavelength of the predefined frequency.

EXAMPLE 59

Another sample of the sound absorbing and shielding structure 1 was constructed to have the same structure as that of the EXAMPLE 53 with the exception that the structure 1 newly incorporated the intermediate layer composed of three layers, i.e., the sound absorbing material layer 3, the air layer 4 and the third panel layer 8 which has the through-bores and was fixed to either the first panel layer 2 or the second panel layer 6 by means of the sound absorbing material layer 3 or the air layer 4; that the opening rate of the through-bores of the third panel layer 8 was selected to be 1% of the whole surface area of the third panel layer 8; that the surface density of the third panel layer 8 was selected to be 1 kg/m²; and that the space between the first and second panel layers 2 and 6 was selected to be 150 mm. The sound absorbing and shielding structure discussed above is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 60

Another sample of the sound absorbing and shielding structure 1 was constructed to have the same structure as that of the EXAMPLE 59 with the exception that the structure 1 newly incorporated the intermediate layer composed of three layers, i.e., the sound absorbing material layer 3, the air layer 4 and the third panel layer 8, which has the through-bores at the opening rate of 50% relative to the total surface of the third panel layer 8; and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 61

Another sample of the sound absorbing and shielding structure 1 was constructed to have the same structure as that of the EXAMPLE 53 with the exception that the structure 1 newly incorporated the intermediate layer composed of three layers, i.e., the sound absorbing material layer 3, the air layer 4 and the third panel layer 8 which has the through-bores at the opening rate of 20% relative to the total surface of the third panel layer 8; that the surface density of the third panel layer 8 was selected to be 0.5 kg/m²; and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 62

Another sample of the sound absorbing and shielding structure 1 was constructed to have the same structure as that of the EXAMPLE 53 with the exception that the structure 1 newly incorporated the intermediate layer composed of three layers, i.e., the sound absorbing material layer 3, the air layer 4 and the third panel layer 8 which has the through-bores at the opening rate of 20% relative to the total surface of the third panel layer 8; that the surface density of the third panel layer 8 was selected to be 10 kg/m²; and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 63

Another sample of the sound absorbing and shielding structure 1 was constructed to have the same structure as that of the EXAMPLE 53 with the exception that the first panel layer 2 had the surface density of 0.8 kg/m$^2$, the thickness of 8 mm, the bending elasticity rate of 500 kPa and the amount of ventilating air at 8 cm$^3$/(cm$^2$·sec), and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/85 of the wavelength of the predefined frequency.

EXAMPLE 64

Another sample of the sound absorbing and shielding structure 1 was constructed to have the same structure as that of the EXAMPLE 53 with the exception that the first panel layer 2 had the surface density of 9 kg/m$^2$, the thickness of 10 mm, the bending elasticity coefficient of 1500 kPa and the amount of ventilating air at 2 cm$^3$/(cm$^2$·sec), and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/68 of the wavelength of the predefined frequency.

EXAMPLE 65

Another sample of the sound absorbing and shielding structure 1 was constructed to have the same structure as that of the EXAMPLE 53 with the exception that the first panel layer 2 had the through-bores whose opening rate of 1% relative to the whole surface of the first panel layer 2. The sound absorbing and shielding structure 1 is intended to meet a predefined frequency of 500 Hz, and the space 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 66

Another sample of the sound absorbing and shielding structure 1 was constructed to have the same structure as that of the EXAMPLE 53 with the exception that the first panel layer 2 had the through-bores at the opening rate of 50% relative to the whole surface of the first panel layer 2. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 67

Another sample of the sound absorbing and shielding structure 1 was constructed to have the same structure as that of the EXAMPLE 53 with the exception that the first panel layer 2 had the ventilating area, except for the through-bores at the opening rate of 30% relative to the whole surface of the first panel layer 2 except for the through-bores. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 68

Another sample of the sound absorbing and shielding structure 1 was constructed to have the same structure as that of the EXAMPLE 53 with the exception that the first panel layer 2 had the ventilating area, except for the through-bores at the opening rate of 100% relative to the whole surface of the first panel layer 2 except for the through-bores. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 69

Another sample of the sound absorbing and shielding structure 1 was constructed to have the same structure as that of the EXAMPLE 53 with the exception that the first panel layer 2 was adjusted to have the surface density of 0.5 kg/m$^2$ and the amount of ventilating air of 2 cm$^3$/(cm$^2$·sec). The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/136 of the wavelength of the predefined frequency.

EXAMPLE 70

Another sample of the sound absorbing and shielding structure 1 was constructed to have the same structure as that of the EXAMPLE 53 with the exception that the first panel layer 2 was adjusted to have the surface density of 9 kg/m$^2$, the thickness of 10 mm, the bending elasticity rate of 1400 kPa and the amount of ventilating air at 1.5 cm$^3$/(cm$^2$·sec), and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/68 of the wavelength of the predefined frequency.

EXAMPLE 71

Another sample of the sound absorbing and shielding structure 1 was constructed to have the same structure as that of the EXAMPLE 53 with the exception that the first panel layer 2 was adjusted to have the surface density of 9 kg/m$^2$, the thickness of 3 mm and the amount of ventilating air at 1 cm$^3$/(cm$^2$·sec, and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/227 of the wavelength of the predefined frequency.

EXAMPLE 72

Another sample of the sound absorbing and shielding structure 1 was constructed to have the same structure as that of the EXAMPLE 53 with the exception that the first panel layer 2 was adjusted to have the surface density of 0.5 kg/m², the thickness of 10 mm and the amount of ventilating air at 10 cm³/(cm²·sec), and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value 1/68 the wavelength of the predefined frequency.

EXAMPLE 73

Another sample of the sound absorbing and shielding structure 1 was constructed to have the same structure as that of the EXAMPLE 53 with the exception that the first panel layer 2 is formed of plastic plate whose main component was polyester; that the first panel layer 2 has the through-bores with its opening rate of 10% relative to the whole surface of the first panel 2; that the surface area of the ventilating portion of the first panel layer was selected to be 50% relative to the whole surface of the first panel layer 2 except for the through-bores thereof; that the first panel layer 2 was adjusted to have the surface density of 0.9 kg/m², the thickness of 3 mm, the bending elasticity rate of 1100 kPa and the amount of ventilating air at 5 cm³/(cm²·sec); and that the space between the first and second panel layers 2 and 6 was selected to be 150 mm. The sound absorbing and shielding structure 1 is intended to meet a predefined frequency of 500 Hz, and the space of 150 mm between the first and second panel layers 2 and 6 corresponds to a value of 88% of ¼ wavelength of the predefined frequency, with the thickness of the first panel layer 2 being selected to a value of 1/227 of the wavelength of the predefined frequency.

Appraisal Test Result

The sound shielding performance of the sound absorbing and shielding structures manufactured based on the above EXAMPLES 53 to 73 has been carried out by measuring the acoustic transmission loss with the use of the reverberation chamber provided under JIS A1416. In this event, the analysis has been conducted with the use of a reference unit composed of a comparison sound shielding body which is constructed of the first panel layer made of plastic plate having the surface density of 1 kg/m², and the second panel layer made of steel plate with the thickness of 0.5 mm, with the space between the first and second panel layers being selected to have values in coincidence with those of respective EXAMPLES. The amount of increment in the sound shielding performance of each sound absorbing and shielding structure superior to that of the comparison sound shielding body is expressed by a unit %. The amount of increment over the preset frequency is expressed by a unit % in terms of the preset frequency (i.e., in an average frequency of ±10 Hz). These results are shown in a table 106 of FIG. 30.

As will be clearly seen from the table 106 shown in FIG. 30, it is confirmed that the sound transmission losses of the respective sound absorbing and shielding structures obtained in the above EXAMPLES 53 to 73 are highly improved.

Now, reference samples will be discussed below with respect to the performances of respective sound absorbing and shielding structures which have been applied to the house and the automotive vehicles in an actual practice.

Reference Sample 1

When assembling the sound absorbing and shielding structure 1, obtained in EXAMPLE 53, into an interior wall and a ceiling of the house, it is confirmed that uncomfortable sound or noise in the vicinity of the preset frequency are reduced to a lower value than that obtained in the related art sound absorbing and shielding structure having a similar thickness, and that the sound shielding performance is improved throughout an entire range of the frequencies.

Reference Sample 2

When assembling the sound absorbing and shielding structure 1, obtained in EXAMPLE 53, into the automotive vehicle wherein the body panel is composed of the second panel layer 6 and the rear parcel panel trim portion composed of the first panel layer 2 which is located at the side of the passenger compartment, it is confirmed that the sound pressure level, which is below a frequency of 500 Hz, in the passenger compartment is decreased by 1 to 2 dB in an average frequency.

Reference Sample 3

When assembling the sound absorbing and shielding structure 1, obtained in EXAMPLE 53, into the automotive vehicle wherein the vehicular body panel is composed of the second panel layer 6 of the aforementioned structure 1 and the pillar trim portions composed of the first panel layers 2, it is confirmed that the sound pressure level, which is below a frequency of 500 Hz, in the passenger compartment is decreased by 0.5 to 1 dB in an average frequency.

Reference Sample 4

When assembling the sound absorbing and shielding structure 1, obtained in EXAMPLE 61, into the automotive vehicle wherein the vehicular outer body panel is composed of the second panel layer 6 of the aforementioned structure 1 and the door trim portions composed of the first panel layers 2, it is confirmed that the sound pressure level, which is below a frequency of 500 Hz, in the passenger compartment is decreased by 1 to 2 dB in an average frequency. In this instance, the third panel layer 8 with the through-bores of the structure 1 was constructed of the plastic plate or the steel plate forming an interior part of each door trim portion, with the sound absorbing and shielding structure 1 being selected to have an adequate rigidity as well as a function of each door. Also, the sound absorbing material layer 3 was incorporated into a part of each door trim portion. Further, it is confirmed that placing the ventilating region in each door trim portion, constructed of the first panel layer 2, at an area close to the ears of the vehicle occupant decreases the sound pressure level by a value of 0.5 dB.

A preferred method of practicing the present invention is as follows:

Step 1—Locating a first panel layer at a position adjacent a source of sound.

Step—Fixing a sound absorbing material layer, which has a ventilating property, onto the first panel layer.

Step—Locating a second panel layer in a spaced relationship relative to the first panel.

Step—Defining an air layer between the first and second panel layers.

The entire content of a Japanese Application No. P2000-266661 with a filing date of Sep. 4, 2000 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A sound absorbing and shielding structure comprising;
    a first panel layer;
    a sound absorbing material layer having a ventilating property;
    a second panel layer; and
    a first air layer formed between the sound absorbing material layer and the second panel layer, and
    wherein the first panel layer, the sound absorbing layer, the first air layer and the second panel layer are located in a sequence from a source of sound and form at least four layers; and
    wherein the second panel layer has a first region formed with through-bores, and a second region having a non-ventilating property, wherein the second panel layer has a surface density ranging from 0.5 to 10 kg/m$^2$, wherein an opening rate of the through-bores relative to a surface area of the second panel layer ranges from 1 to 50%, wherein a surface ratio between the second panel layer and the sound absorbing material layer ranges from 1:5 to 5:1, wherein the first air layer has a maximum thickness of a value 10% of a maximum thickness of the sound absorbing and shielding structure, and wherein the first air layer has a content product whose volume ratio ranges from 10 to 90% relative to a volume of the first air layer.

2. The sound absorbing and shielding structure according to claim 1, wherein an opening rate of the through-bores relative to the surface area of the second panel layer ranges from 5 to 40%, wherein a surface ratio between the second panel layer and the sound absorbing material layer ranges from 1:3 to 3:1, wherein the first air layer has a maximum thickness of a value above 30% of a maximum thickness of the sound absorbing and shielding structure, and wherein the first air layer has a content product whose volume ratio ranges from 40 to 90% relative to a volume of the first air layer.

3. The sound absorbing and shielding structure according to claim 1, wherein the second panel layer has a surface density ranging from 3 to 5 kg/m$^2$, wherein an opening rate of the through-bores relative to a surface area of the second panel layer ranges from 10 to 30%, wherein a surface ratio between the second panel layer and the sound absorbing material layer ranges from 1:2 to 2:1, wherein the first air layer has a maximum thickness of a value 50% of a maximum thickness of the sound absorbing and shielding structure, and wherein the first air layer has a content product whose volume ratio ranges from 50 to 90% relative to a volume of the first air layer.

4. A sound absorbing and shielding structure comprising:
    a first panel layer;
    a sound absorbing material layer having a ventilating property;
    a second panel layer;
    a first air layer formed between a sound absorbing material layer and the second panel layer;
    a third panel layer located between the source of sound and the first panel layer; and
    a second air layer formed between the source of sound and the third panel layer, and
    wherein the second air layer, the third panel layer, the first panel layer, the sound absorbing layer, the first air layer, and the second panel layer are located in a sequence from the source of sound and form at least six layers;
    wherein the first and third panel layers have first regions formed with respective through-bores and second regions each having a non-ventilating property;
    wherein the second air layer has a thickness ranging from 10 to 60% of a maximum thickness of the sound absorbing and shielding structure; wherein the second air layer has a content product having a volume ratio ranging from 10 to 90% relative to a volume of the second air layer; wherein the sound absorbing material layer has a ventilating property at a side of the first air layer;
    wherein the second panel layer is made of plastic having a first region formed with through-bores, whose opening rate ranges from 1 to 50% relative to a whole surface of the second panel layer, and a second region having a non-ventilating property at an area except for the through-bores and having the surface density ranging from 0.5 to 10 kg/m$^2$;
    wherein a surface ratio between the second panel layer and the sound absorbing material layer ranges from 1:5 to 5:1; and
    wherein the first air layer has a content product having a volume ratio ranging from 10 to 90% relative to a volume of the first air layer.

5. The sound absorbing and shielding structure according to claim 4, wherein the second air layer has a thickness ranging from 20 to 50% of a total thickness of the sound absorbing and shielding structure;
    wherein the second panel layer has a surface density ranging from 3 to 5 kg/m$^2$ and the through-bores having the opening rate ranging from 10 to 30%;
    wherein the surface ratio between the second panel layer and the sound absorbing material layer ranges from 1:2 to 2:1;
    wherein the first air layer has a maximum thickness of a value above 25% of a total thickness of the sound absorbing and shielding structure; and
    wherein the first air layer has the content product having a volume ratio ranging from 50 to 90% relative to the volume of the first air layer.

6. The sound absorbing and shielding structure according to claim 1, wherein the sound absorbing material layer has a first region formed with through-bores and a second region except for the first region, and wherein the second region of the sound absorbing material layer has a minimum thickness portion with a bending elasticity coefficient ranging from 100 to 2000 kPa.

7. The sound absorbing and shielding structure according to claim 6, wherein the second region of the sound absorbing material layer has the minimum thickness portion with the bending elasticity coefficient ranging from 500 to 1500 kPa.

8. A sound absorbing and shielding structure comprising:
    a first panel layer;
    a sound absorbing material layer having a ventilating property;

a second panel layer; and a first air layer formed between the sound absorbing material layer and the second panel layer;

wherein the first panel layer, the sound absorbing layer, the first air layer and the second panel layer are located in a sequence from a source of sound and form at least four layers; and wherein the sound absorbing material includes a multi-layered structure composed of at least a high density layer and a low density layer.

9. A sound absorbing and shielding structure comprising:

a first panel layer;

a sound absorbing material layer having a ventilating property;

a second panel layer; and a first air layer formed between the sound absorbing material layer and the second panel layer;

wherein the first panel layer, the sound absorbing layer, the first air layer and the second panel layer are located in a sequence from a source of sound and form at least four layers; and wherein the high density layer of the sound absorbing material layer is made of a fibrous layer.

10. The sound absorbing and shielding structure according to claim 9, wherein the high density layer of the sound absorbing material layer has a minimum thickness portion with a bending elasticity coefficient ranging from 1 to 500 MPa.

11. The sound absorbing and shielding structure according to claim 10, wherein the high density layer of the sound absorbing material layer has the minimum thickness portion with the bending elasticity coefficient ranging from 5 to 300 MPa.

12. The sound absorbing and shielding structure according to claim 8, wherein the high density layer of the sound absorbing material layer is made of plastic and has a first region formed with through-bores for mounting component parts and a second region formed with an opening portion with an opening rate ranging from 1 to 80% relative to a surface area of the high density layer.

13. The sound absorbing and shielding structure according to claim 12, wherein the opening rate of the opening portion of the sound absorbing material layer ranges from 20 to 50%.

14. The sound absorbing and shielding structure according to claim 1, wherein the second panel layer includes a plurality of layers, at least one of which is made of a fibrous layer.

15. The sound absorbing and shielding structure according to claim 1, further comprising a third panel layer located between the source of sound and the first panel layer, with a second air layer being located between the first and third panel layer, wherein at least one of the first and second air layers has a fibrous layer.

16. The sound absorbing and shielding structure according to claim 9, wherein the fibrous layer of the sound absorbing layer has a fiber diameter ranging from 5 to 100 μm, short fibers in a range from 50 to 90% with a fiber length ranging from 30 to 100 mm, and an adhesive component of 5 to 50 w %.

17. The sound absorbing and shielding structure according to claim 16, wherein the fibrous layer is made of polyester.

18. The sound absorbing and shielding structure according to claim 1, wherein the sound absorbing and shielding structure includes a four-layered structure applied to an automotive vehicle which includes a partition wall bisecting a vehicle body into an engine room and a passenger compartment, wherein the partition wall is constructed of the first panel layer and serves as a dash insulator exposed to the passenger compartment of the automotive vehicle.

19. The sound absorbing and shielding structure according to claim 1, wherein the six-layered structure of the sound absorbing and shielding structure is applied to an automotive vehicle which includes a partition wall bisecting a vehicle body from an engine room having a panel located therein to a passenger compartment, wherein the panel is constructed of the third panel layer, and the partition wall is constructed of the first panel layer and serves as a dash insulator exposed to the passenger compartment of the automotive vehicle.

20. A sound absorbing and shielding structure comprising:

a first panel layer;

a sound absorbing material layer having a ventilating property;

a second panel layer;

a first air layer formed between the sound absorbing material layer and the second panel layer; and at least one content product having a volume ratio ranging from 10 to 90% relative to a total volume of the sound absorbing material layer and the first air layer, wherein the first panel layer, the sound absorbing layer, the first air layer and the second panel layer are located in a sequence from a source of sound and form at least four layers; and wherein the sound absorbing material layer has a preset surface area ranging from 5 to 90% relative to a surface area of the second panel layer, wherein the first air layer has a preset total thickness ranging from 3 to 70% relative to a maximum thickness of the sound absorbing and shielding structure, and wherein the first panel layer has a first region formed with through-bores with an opening rate ranging from 1 to 50% relative to a whole surface area of the first panel layer and a second region, except for the first region, formed with a ventilating area with a rate ranging from 30 to 100% relative to a whole surface area of the first panel layer except for the through-bores, the first panel layer having a surface density ranging from 0.5 to 10 kg/m$^2$.

21. The sound absorbing and shielding structure according to claim 20, further comprising a third panel layer located between the sound absorbing material layer and the first air layer to form five layers, wherein the third panel layer has through-bores and is located to one of the first and second panel layers to exposed to the first air layer and the sound absorbing material layer, with the through-bores of the third panel layers having an opening rate ranging from 1 to 50% relative to a whole surface of the third panel layer and the third panel layer having a surface density ranging from 0.5 to 10 kg/m$^2$.

22. The sound absorbing and shielding structure according to claim 21, further comprising a content product having a volume ratio ranging from 50 to 90% relative to a total volume of the sound absorbing material layer and the first air layer, wherein the first air layer has a preset thickness ranging from 15 to 50% relative to a maximum thickness of the sound absorbing and shielding structure, wherein the third panel layer has a surface density ranging from 1 to 5 kg/m$^2$, wherein the first panel layer has a first region formed with through-bores, a second region formed with a ventilating area ranging from to 50 to 100% relative to a whole surface area of the first panel layer except for the first region and a surface density ranging from 1 to 5 kg/m$^2$.

23. The sound absorbing and shielding structure according to claim 20, wherein the ventilating area has a minimum thickness portion having the amount of ventilating air ranging from 1 to 10 cm$^3$/(cm$^2$·sec).

24. The sound absorbing and shielding structure according to claim 20, wherein the ventilating area has a minimum thickness portion has a bending elasticity rate ranging from 500 to 1500 kPa.

25. The sound absorbing and shielding structure according to claim 20, wherein the first and second panel layers are spaced from one another to provide a space in a value ranging 80 to 120% of ¼ wavelength of a preset frequency for a sound absorbing characteristic, and wherein the first panel layer has a thickness of a value below ⅛ wavelength of the preset frequency.

26. The sound absorbing and shielding structure according to claim 20, wherein the first panel layer includes plural layers, at least one of which is composed of a fibrous layer.

27. The sound absorbing and shielding structure according to claim 20, wherein the ventilating area of the first panel layer is composed of a fibrous layer.

28. The sound absorbing and shielding structure according to claim 26, wherein the fibrous layer is made of fibers having a mass ranging from 50 to 95% and a fiber diameter ranging from 5 to 150 μm, and an adhesive component having a mass ranging from 5 to 50%.

29. The sound absorbing and shielding structure according to claim 28, wherein the fibers are composed of polyester.

30. The sound absorbing and shielding structure according to claim 20, wherein the first panel layer includes a rear parcel trim portion located inside a passenger compartment of an automotive vehicle and the second panel layer includes a body panel of the automotive vehicle.

31. The sound absorbing and shielding structure according to claim 20, wherein the first panel layer includes a pillar trim portion located inside a passenger compartment of an automotive vehicle and the second panel layer includes a vehicular outer panel of the automotive vehicle.

32. The sound absorbing and shielding structure according to claim 20, wherein the first panel layer includes a door trim portion located inside a passenger compartment of an automotive vehicle and the second panel layer includes a vehicular outer panel of the automotive vehicle.

* * * * *